US008374493B2

(12) United States Patent
Itani

(10) Patent No.: US 8,374,493 B2
(45) Date of Patent: Feb. 12, 2013

(54) PLAYBACK APPARATUS

(75) Inventor: Tetsuya Itani, Nara (JP)

(73) Assignee: Panasonic Corporation, Osaka (JP)

( * ) Notice: Subject to any disclaimer, the term of this patent is extended or adjusted under 35 U.S.C. 154(b) by 302 days.

(21) Appl. No.: 12/636,465

(22) Filed: Dec. 11, 2009

(65) Prior Publication Data
US 2010/0226618 A1 Sep. 9, 2010

(30) Foreign Application Priority Data

Dec. 12, 2008 (JP) ................................. 2008-316368

(51) Int. Cl.
H04N 9/70 (2006.01)
(52) U.S. Cl. ........................................ 386/300; 386/304
(58) Field of Classification Search .................. None
See application file for complete search history.

(56) References Cited

U.S. PATENT DOCUMENTS

| 6,108,036 | A | * | 8/2000 | Harada et al. | ............. | 348/219.1 |
| 2006/0071825 | A1 | * | 4/2006 | Demos | ............. | 341/50 |
| 2007/0030996 | A1 | * | 2/2007 | Winger et al. | ............. | 382/100 |
| 2007/0296811 | A1 | * | 12/2007 | Miyazaki et al. | ............. | 348/97 |
| 2009/0021815 | A1 | * | 1/2009 | Waldman et al. | ............. | 359/24 |
| 2009/0232213 | A1 | * | 9/2009 | Jia | ............. | 375/240.16 |
| 2009/0290857 | A1 | | 11/2009 | Itani | | |

FOREIGN PATENT DOCUMENTS

JP 2189086 7/1990
WO 2007/063912 6/2007

OTHER PUBLICATIONS

Takehisa, Yasuo; "An Image Expansion Using Statistical Methods"; Information Technology Research Institute of Nagano Prefecture Research report, No. 18, 2002, 22 pages.
Takehisa, Yasuo et al., "Improvement of Still Image Resolution by Applying Multiframe Method"; Super-Resolution f Still Image from Video Sequence; Information Technology Research Institute of Nagano Prefecture Research Report, No. 19, 2003, 21 pages.

* cited by examiner

Primary Examiner — William C Vaughn, Jr.
Assistant Examiner — Eileen Adams

(57) ABSTRACT

The present invention provides a playback apparatus for up-converting a video signal without magnifying film grains. An up-converter 5 performs up-conversion on a frame image in a video signal. A film grain detection circuit 6 detects film grains from the video signal. A frequency converter 7 converts spatial frequencies of the detected film grains on the video signal after the resolution conversion to high frequencies.

14 Claims, 33 Drawing Sheets

FIG. 2
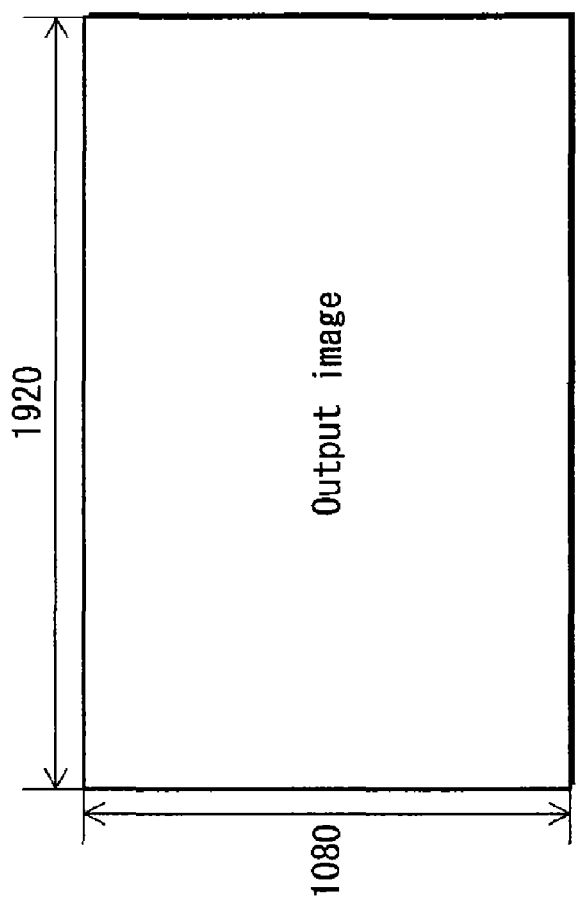
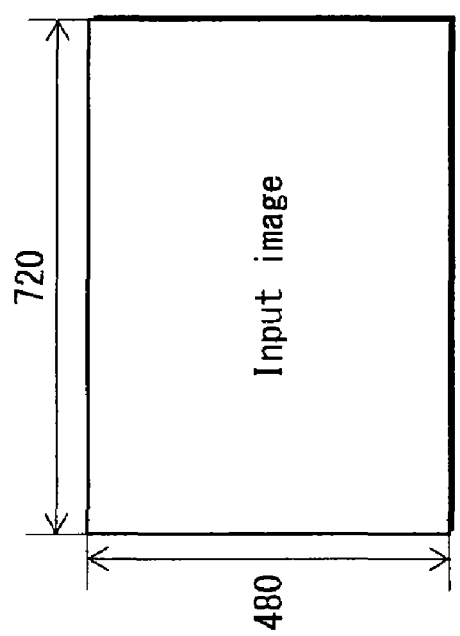

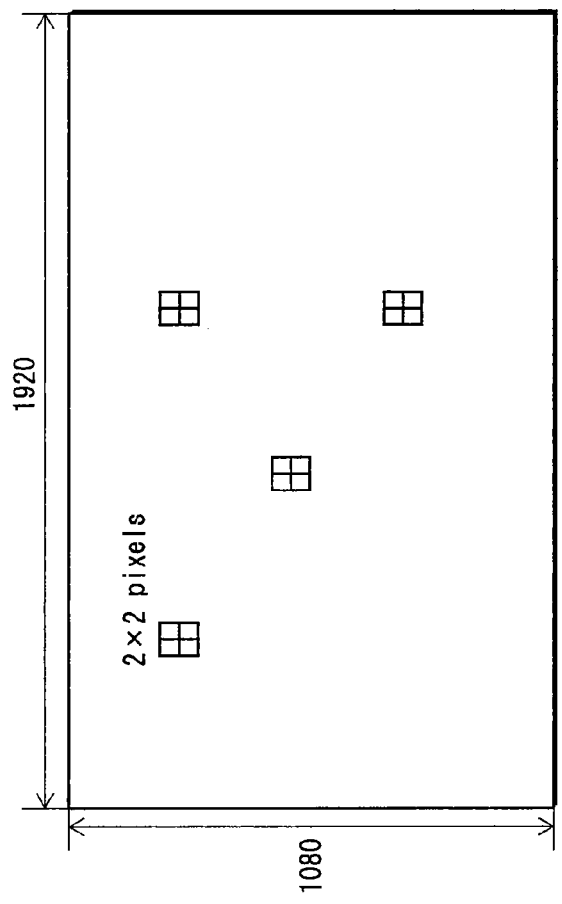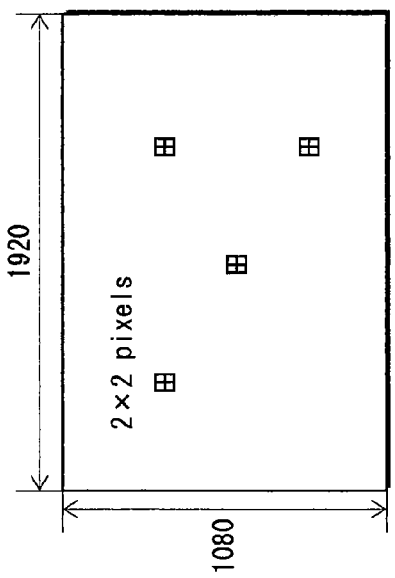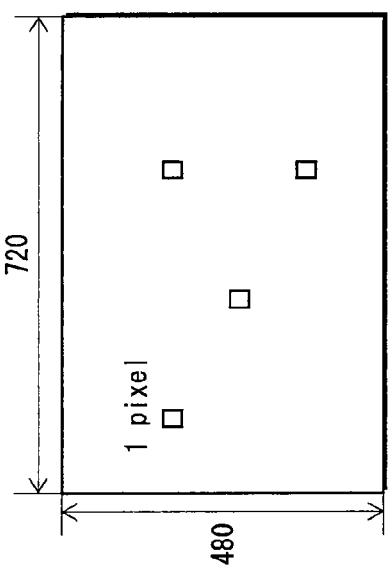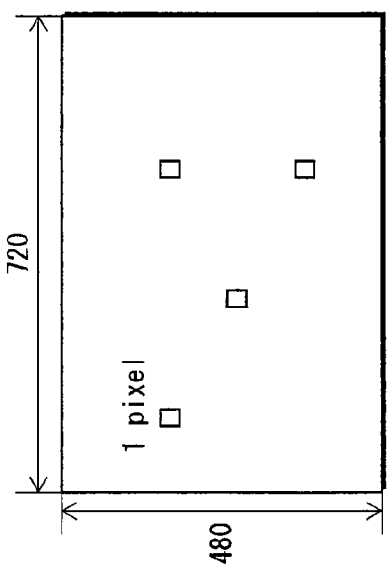
FIG. 12A
FIG. 12B

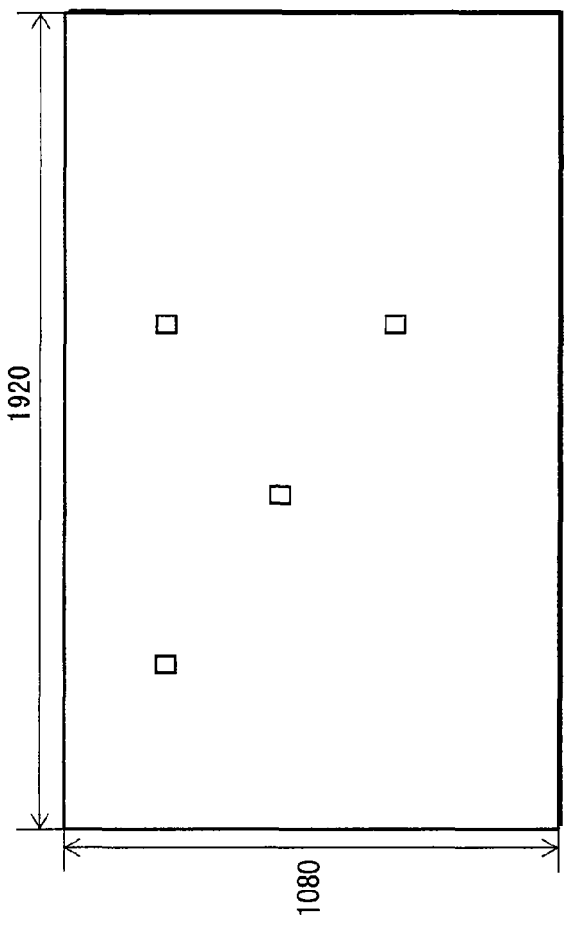
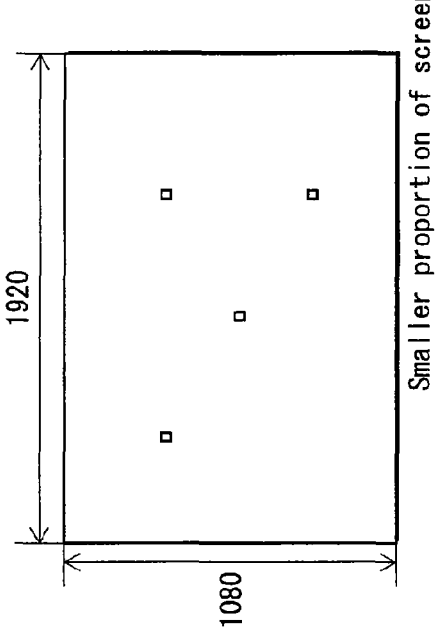
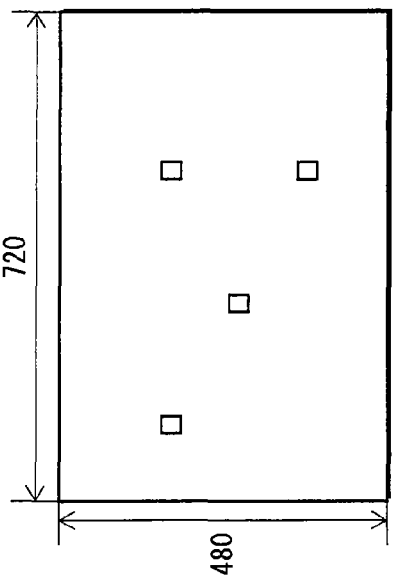
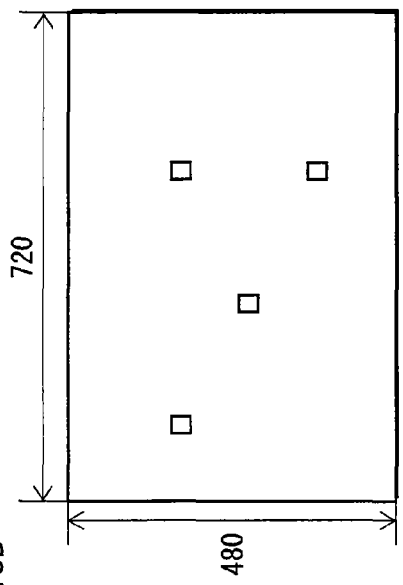
FIG. 13A
FIG. 13B

FIG. 15
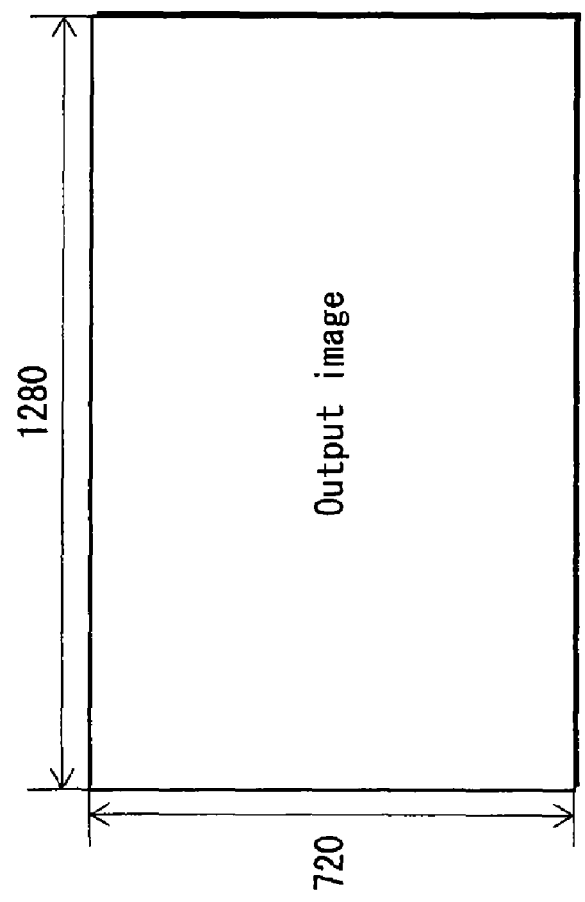
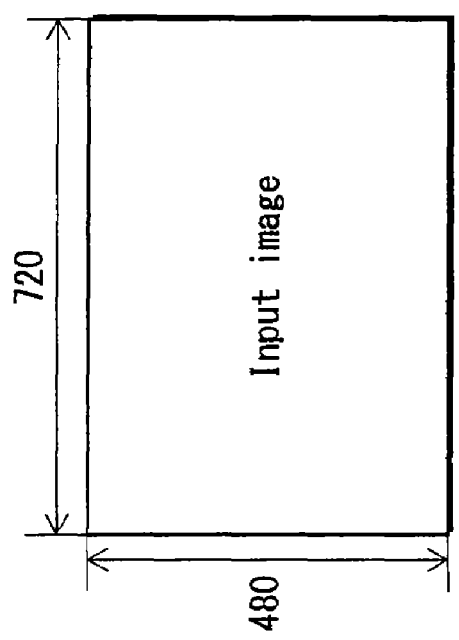

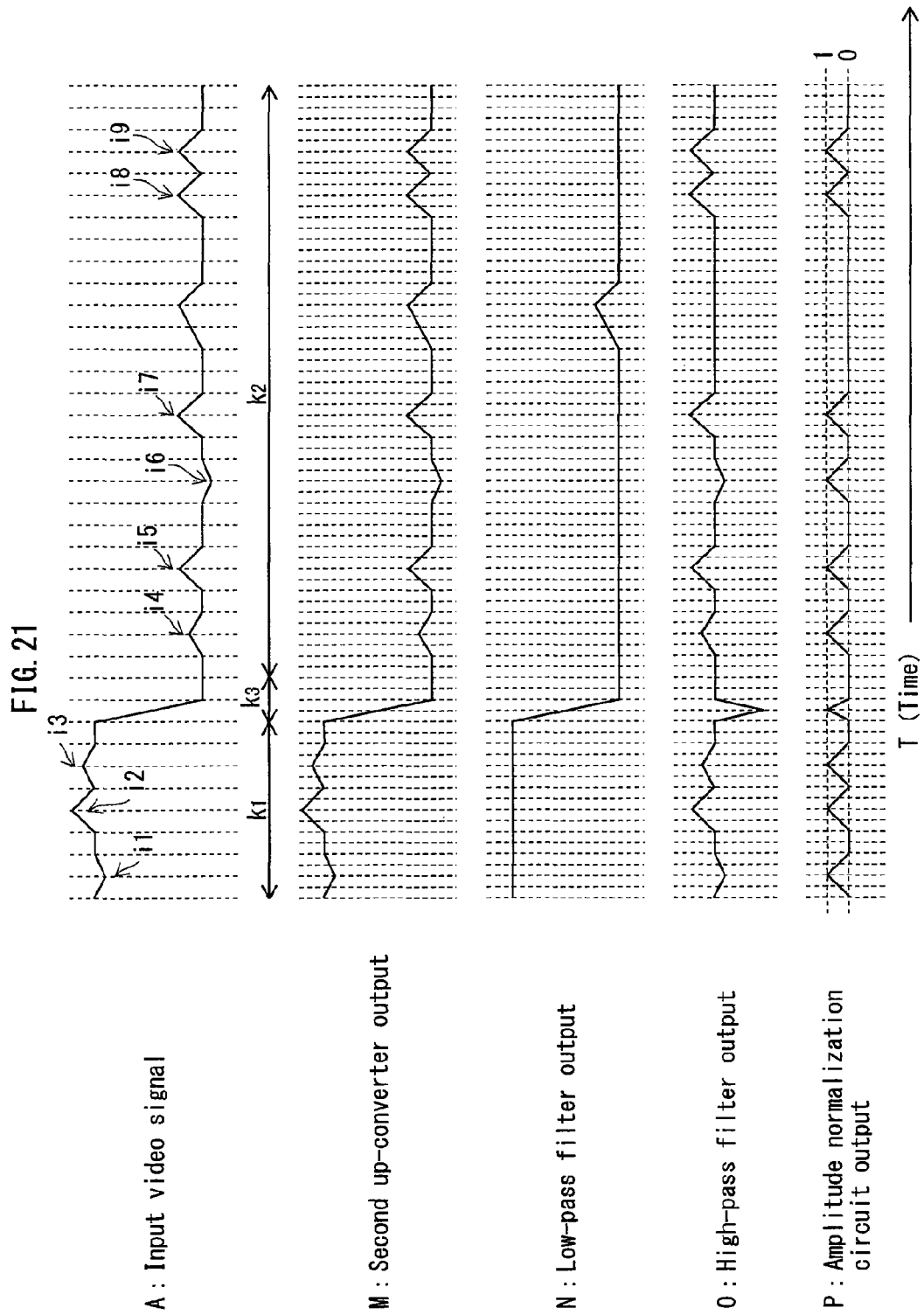

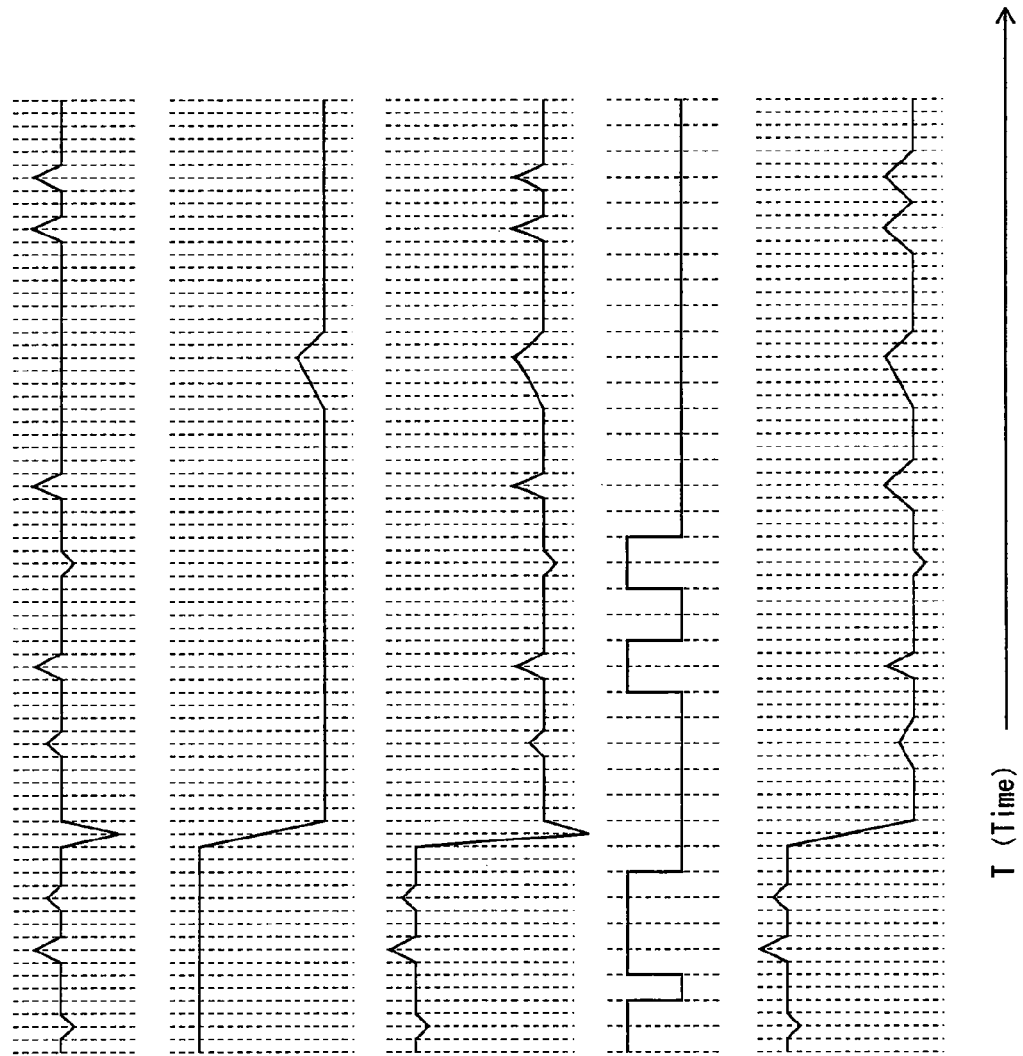

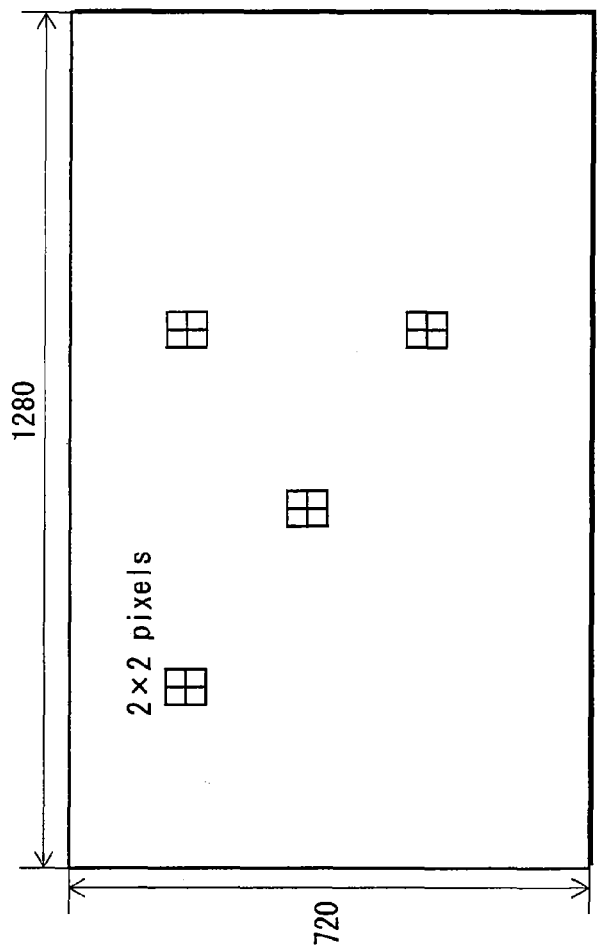
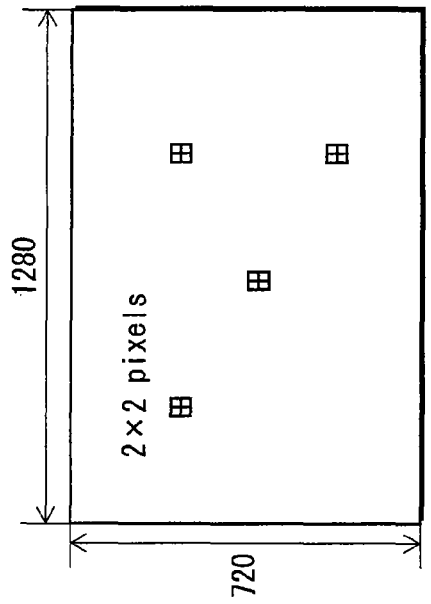
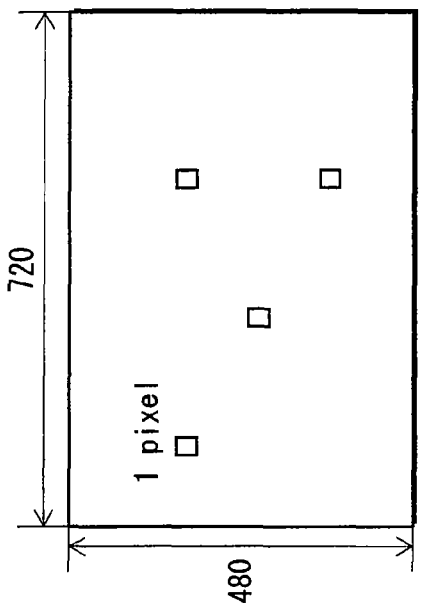
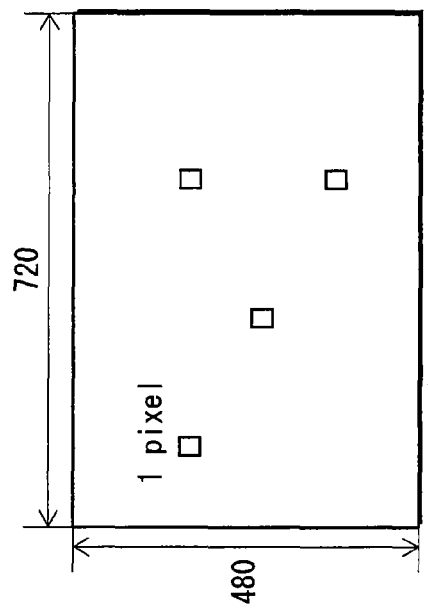
FIG. 23A
FIG. 23B

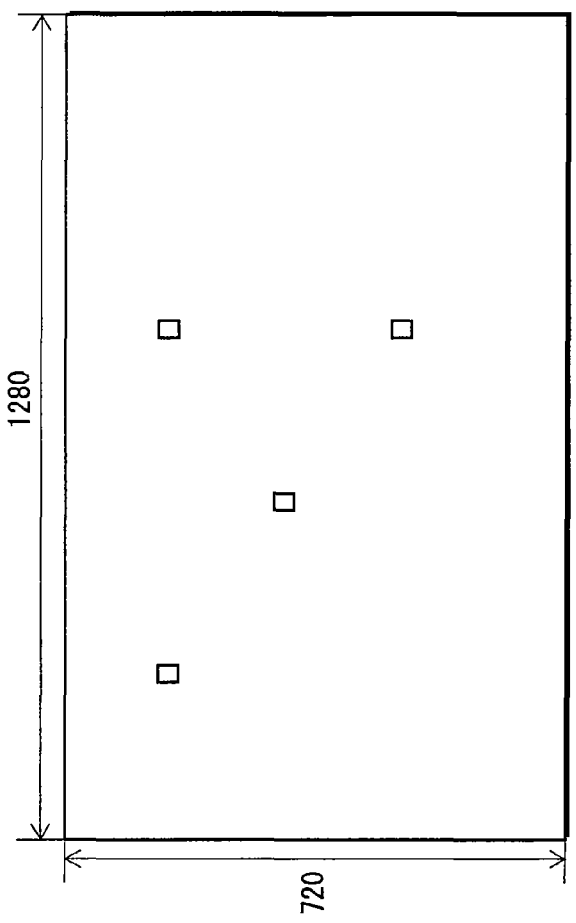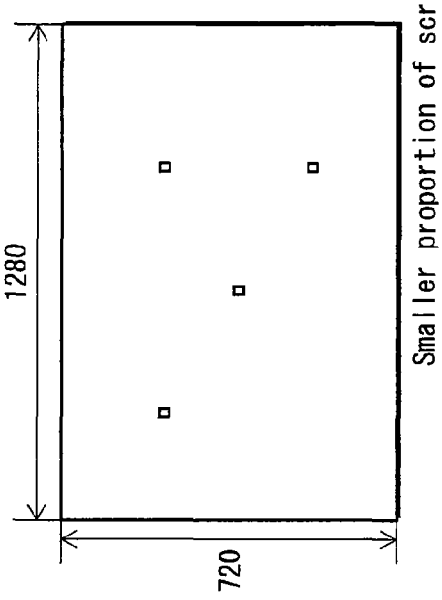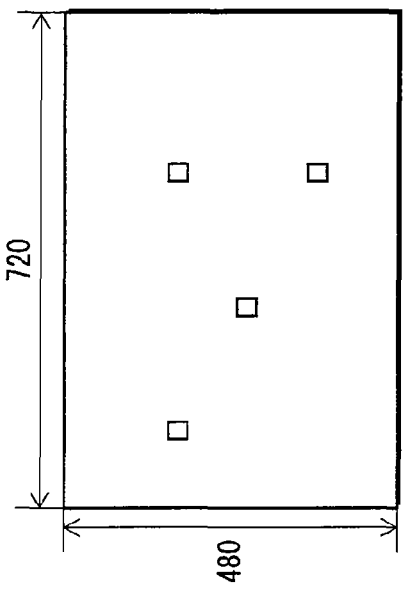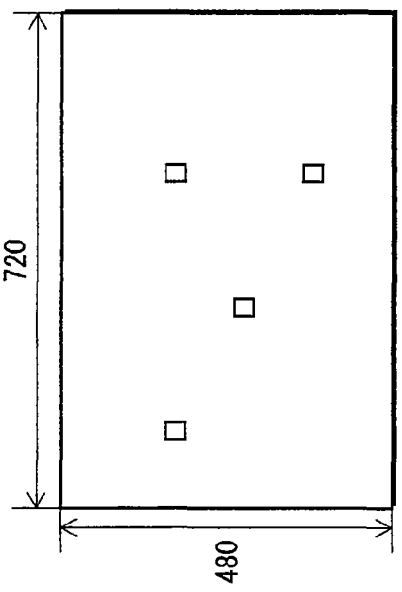
FIG. 24A
FIG. 24B

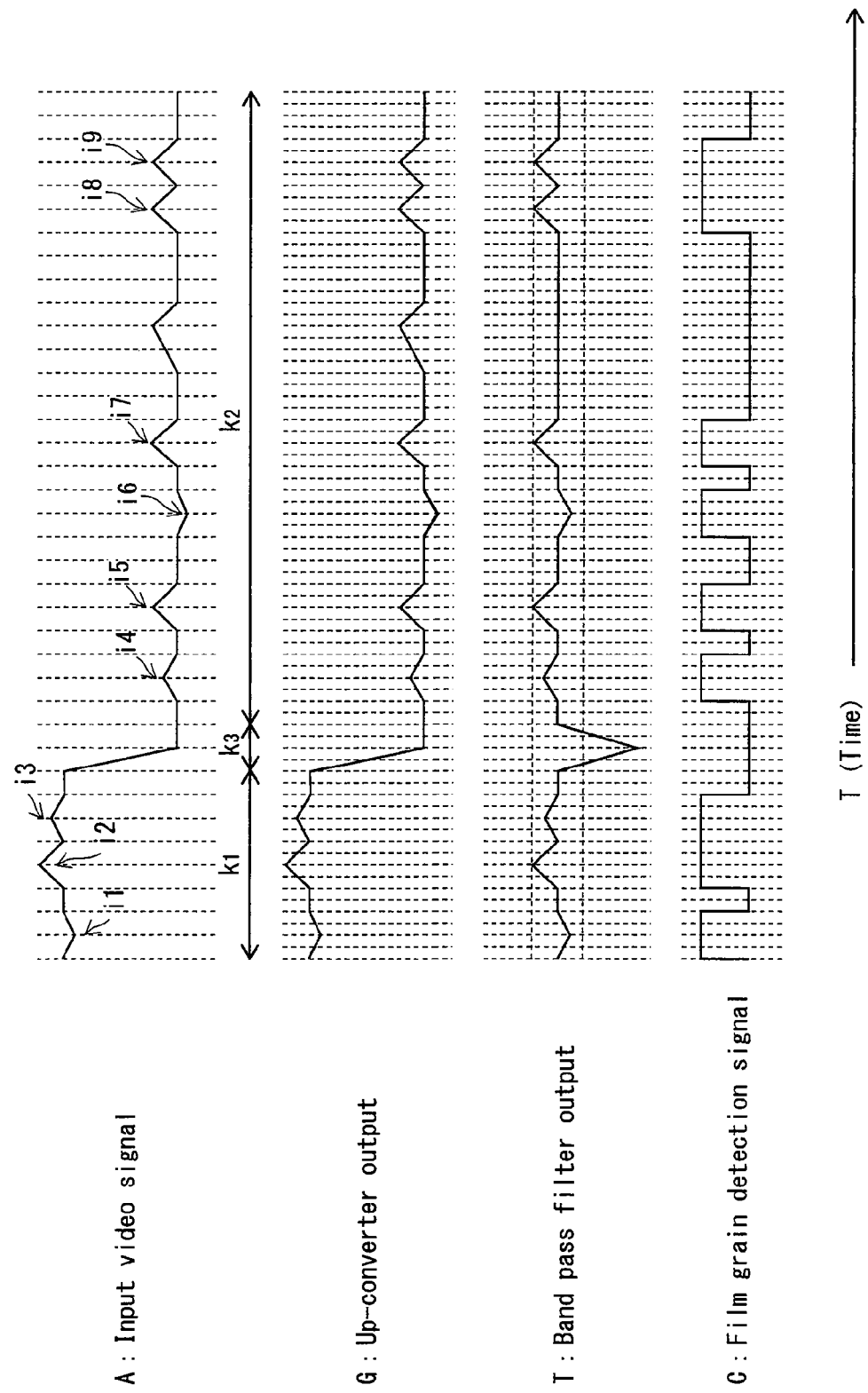

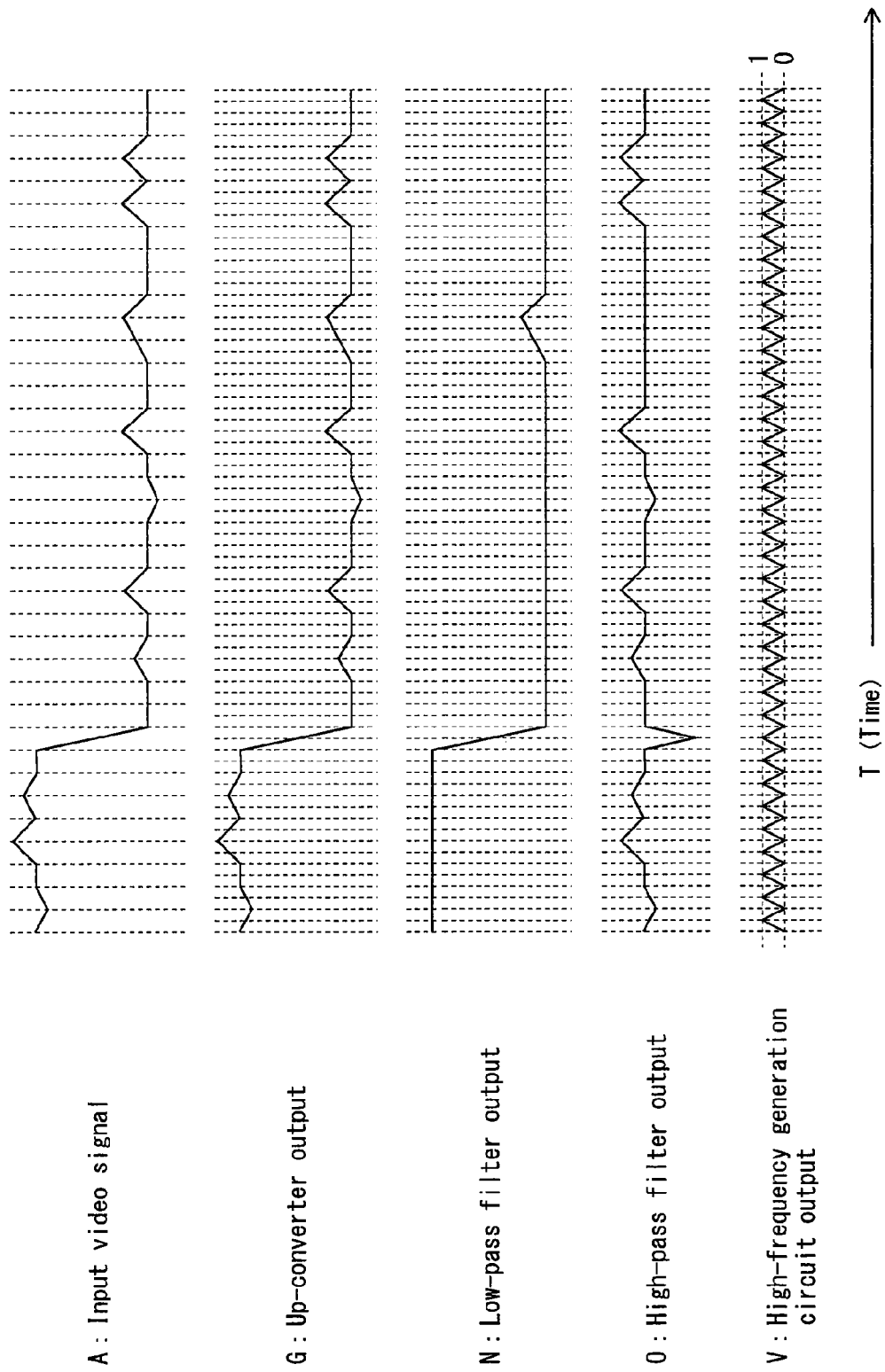

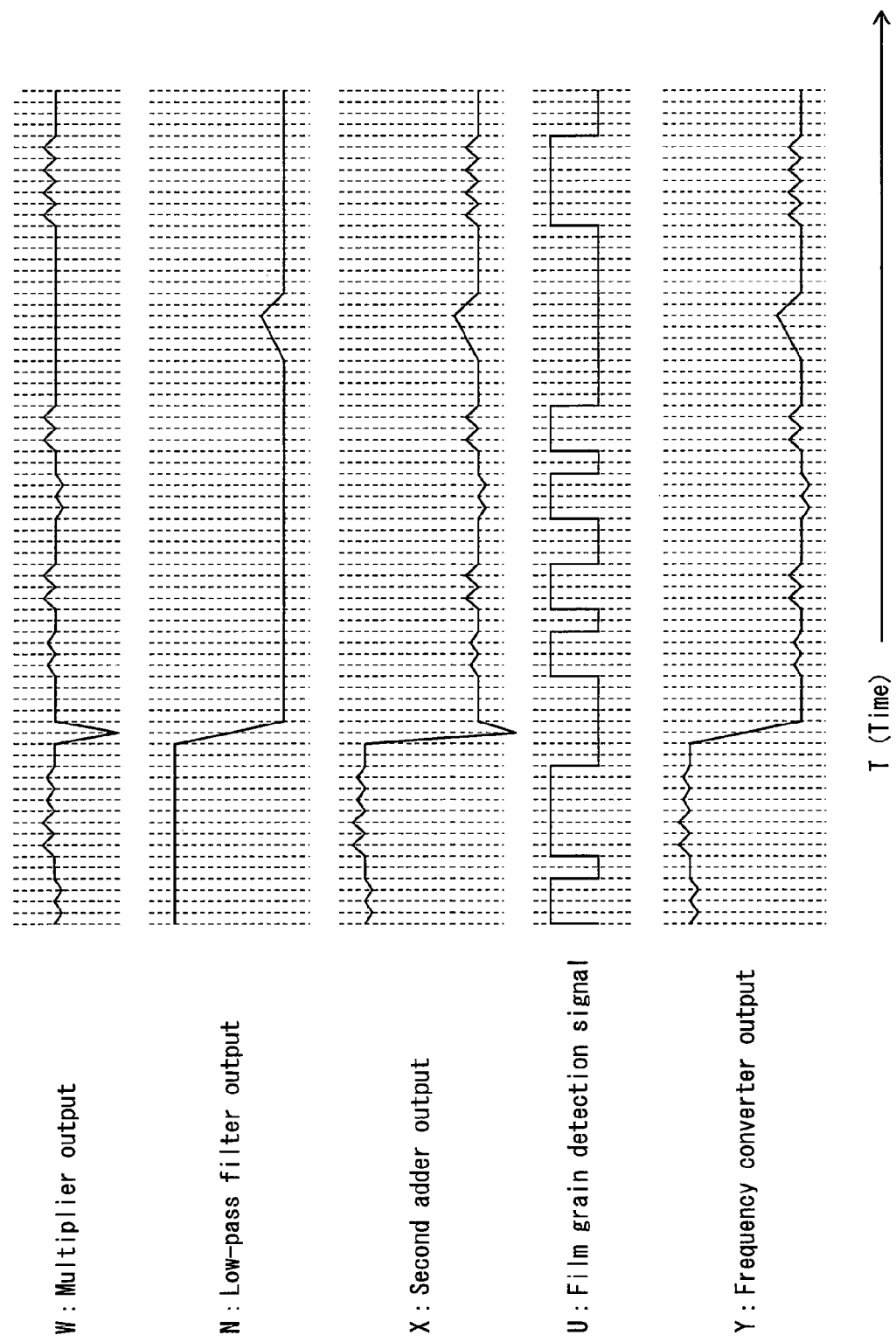

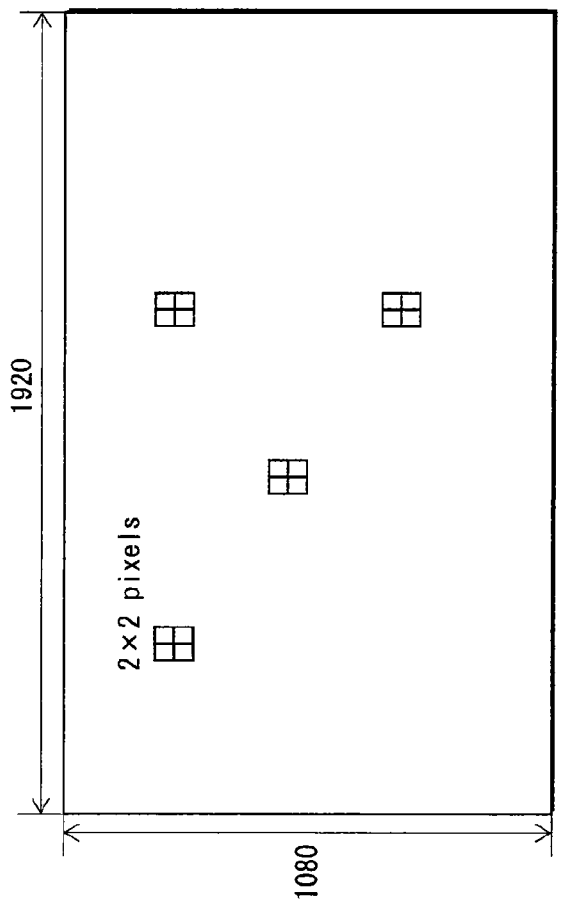
FIG. 31A
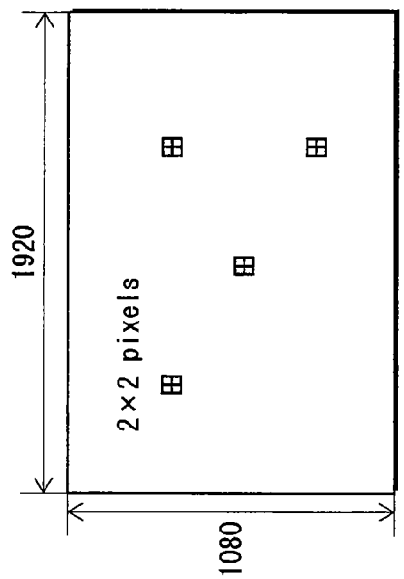
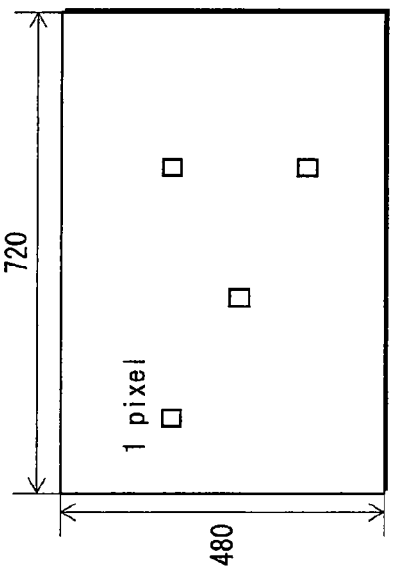
FIG. 31B
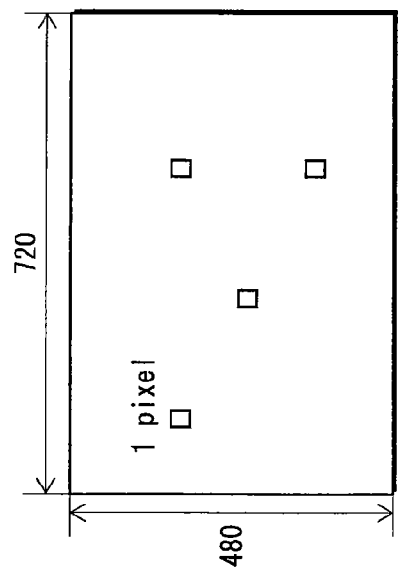

PLAYBACK APPARATUS

BACKGROUND OF THE INVENTION (1) Field of the Invention

The present invention belongs to the technical field of resolution conversion technology.

(2) Description of the Related Art

Resolution conversion technology refers to performing conversion processing on a video signal supplied from a recording medium or a broadcast wave to obtain a higher-resolution video signal, and outputting the video signal to a television, and this technology has gained a greater level of importance due to the widespread use of high-definition television sets in recent years.

For example, if an original video is SD video having 720 horizontal pixels and 420 vertical lines, performing resolution conversion on the original video enables obtaining HD video having 1920 horizontal pixels and 1080 vertical lines. Technology for converting an original video signal into a higher-definition video signal in this way is called "up-conversion". The opposite is called "down-conversion". The invention described in the following patent document is known as a conventional technology for resolution conversion.

The conventional technology described in patent document 1 performs resolution conversion on a video signal having 480 vertical lines (525 scanning lines) in conformity with a standard television signal.

Furthermore, many resolution conversion techniques have been proposed, such as resolution conversion using a statistical technique to increase resolution (see non-patent document 1) and resolution conversion on a video signal having a plurality of frames (see non-patent document 2).

Patent document 1: Japanese Patent Application Publication No. 02-189086 (FIG. 1)

Non-patent document 1: Research on Making an Image High Definition Using a Statistical Technique (Information Technology Research Institute of Nagano Prefecture, Research Report No. 18)

Non-patent document 2: Making an Image High Definition Using a Multi-frame Method (Information Technology Research Institute of Nagano Prefecture, Research Report No. 19)

SUMMARY OF THE INVENTION

However, now that large-screen high-definition televisions are widely used, reproduction of film grains is considered important in the resolution conversion technical field such as described above. The term "film grains" refers to images of silver salt particles that appear in a video when film is developed. Generally speaking, film is developed by applying silver salt and then exposing the film. When this is done, spots and images of the silver salt particles from the application appear in the developed video. When DVD recording is performed, video is recorded such that film grains appear, in order to reproduce the experience of viewing at a cinema.

Upon examining how film grains are expressed after the up-conversion, it can be concluded that, since an HD image represents a high-definition image as described above, film grains should be expressed by a small number of pixels such as one or two pixels in such a resolution. This is because there is a tangible sense of high definition when the film grains appear as such a small number of pixels. However, when trying to express film grains in the above up-conversion, film grains that are expressed as one or two pixels in an SD image are expressed as a grouping of a plurality of pixels such as 2 vertical pixels by 3 horizontal pixels in the up-converted HD image. If the film grains are expressed thus as a plurality of pixels, users sense that large film grains are appearing on HD video, and do not have a tangible sense that the video is high definition. In this way, when film grains are expressed as many pixels in up-conversion, a ratio of the film grains to the image as a whole does not change compared to the image before the up-conversion, and there is not a tangible sense of having become high definition due to the up-conversion.

An aim of the present invention is to provide a playback apparatus that gives a user the tangible sense that an image has become high definition due to the up-conversion.

MEANS TO SOLVE THE PROBLEMS

To fulfill the aim, one aspect of the present invention provides a playback apparatus comprising: a resolution converter operable to perform resolution conversion on a frame image in a video signal to increase the number of either or both horizontal pixels and vertical pixels in the frame image; and a spatial frequency converter operable to perform spatial frequency conversion on a small-amplitude component in a particular spatial frequency domain of the video signal either before or after the resolution conversion so that a spatial frequency of the video signal after the resolution conversion is increased.

ADVANTAGEOUS EFFECT OF THE INVENTION

In the above playback apparatus pertaining to the present invention, the spatial frequency converter converts the frequency of the film grain components on the video signal on which the resolution conversion has been performed. As a result, the film grains appear in units of one or two pixels in the HD image after the up-conversion having a resolution of 1080 vertical lines by 1920 horizontal pixels. When the film grains appear in units of one or two pixels in a total image resolution of 1080 vertical lines by 1920 horizontal pixels, the size of the film grains in proportion to the total image becomes smaller, giving a user a tangible sense of high-definition video playback due to the up-conversion function of the playback apparatus.

Also, since the number of the film grains appearing in the image after the conversion is the same as the number of film grains included in the image before the conversion. Thus, film grains do not appear unnaturally. Additionally, film grains do not appear in the image in an excessive amount.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 2 shows the number of pixels in an input image and the number of pixels in an output image, pertaining to embodiment 1;

FIG. 12A contrasts how an SD image containing film grains changes when up-conversion is performed on the SD image;

FIG. 12B shows the SD image of FIG. 12A before the up-conversion and an exemplary display of an HD image after the up-conversion when displayed on a television of the same size;

FIG. 13A contrasts how an SD image changes when the frequency of film grains has been converted after up-conversion of the SD image;

FIG. 13B shows the SD image of FIG. 13A before the up-conversion and an exemplary display of an HD image on a television of the same size when the frequency of film grains has been converted after the up-conversion;

FIG. 15 shows the number of pixels in an input image and the number of pixels in an output image, pertaining to embodiment 2;

FIG. 21 is a timing chart showing an operation of the second frequency converter 35 pertaining to embodiment 2;

FIG. 22 is a timing chart showing a contrast between a signal output from the second film grain detection circuit 34 pertaining to embodiment 2 and a signal output from the second frequency converter 35 pertaining to embodiment 2;

FIG. 23A contrasts how an SD image containing film grains changes when up-conversion is performed on the SD image;

FIG. 23B shows the SD image of FIG. 23A before the up-conversion and an exemplary display of an HD image after the up-conversion when displayed on a television of the same size;

FIG. 24A contrasts how an SD image changes when the frequency of film grains has been converted after up-conversion of the SD image;

FIG. 24B shows the SD image of FIG. 24A before the up-conversion and an exemplary display of an HD image on a television of the same size when the frequency of film grains has been converted after the up-conversion;

FIG. 28 is a timing chart showing a contrast between a signal output from the third film grain detection circuit 51 pertaining to embodiment 3 and signals output from constituent elements;

FIG. 29 is a timing chart showing an operation of the third frequency converter 52 pertaining to embodiment 3;

FIG. 30 is a timing chart showing a contrast between a signal output from the third film grain detection circuit 51 pertaining to embodiment 3 and a signal output from the third frequency converter 52 pertaining to embodiment 3;

FIG. 31A contrasts how an SD image containing film grains changes when up-conversion is performed on the SD image;

FIG. 31B shows the SD image of FIG. 31A before the up-conversion and an exemplary display of an HD image after the up-conversion when displayed on a television of the same size;

Figure 1:
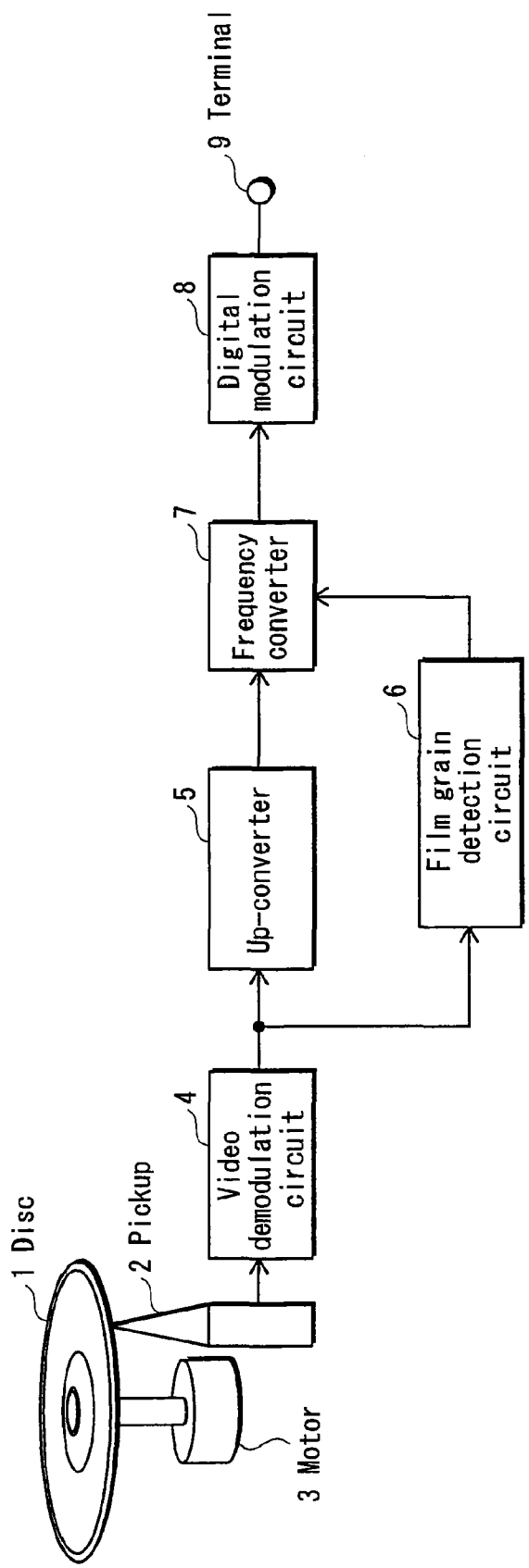
FIG. 1 shows an internal structure of a playback apparatus pertaining to embodiment 1.

DESCRIPTION OF THE CHARACTERS 1 optical disc
2 optical pickup unit
3 motor
4 video demodulation circuit
5 up-converter
6 film grain detection circuit
7 frequency converter
8 digital modulation circuit
9 terminal
10 8-line memory
11 vertical polyphase filter
12 horizontal polyphase filter
13 delay memory
14 band pass filter
15 limiter
16 delay
17 adder
18 ½ amplifier
19 first delay group
20 second delay group
21 switch control circuit
22 switch
23 8-line memory
31 reception antenna
32 tuner
33 second up-converter 34 second film grain detection circuit
35 second frequency converter
36 second vertical polyphase filter
37 second horizontal polyphase filter
38 second delay memory
39 frame memory
40 subtracter
41 low-pass filter
42 high-pass filter
43 amplitude normalization circuit
44 multiplier
45 second adder
46 second switch
51 third film grain detection circuit
52 third frequency converter
53 GUI generator
54 controller
55 remote control
56 third switch
57 second band pass filter
58 high-frequency generation circuit

DESCRIPTION OF THE PREFERRED EMBODIMENTS

Embodiment 1

The following describes an embodiment of a playback apparatus pertaining to the present invention. The playback apparatus pertaining to the present invention can be industrially produced in accordance with the internal structure shown in FIG. 1.

Figure 11:
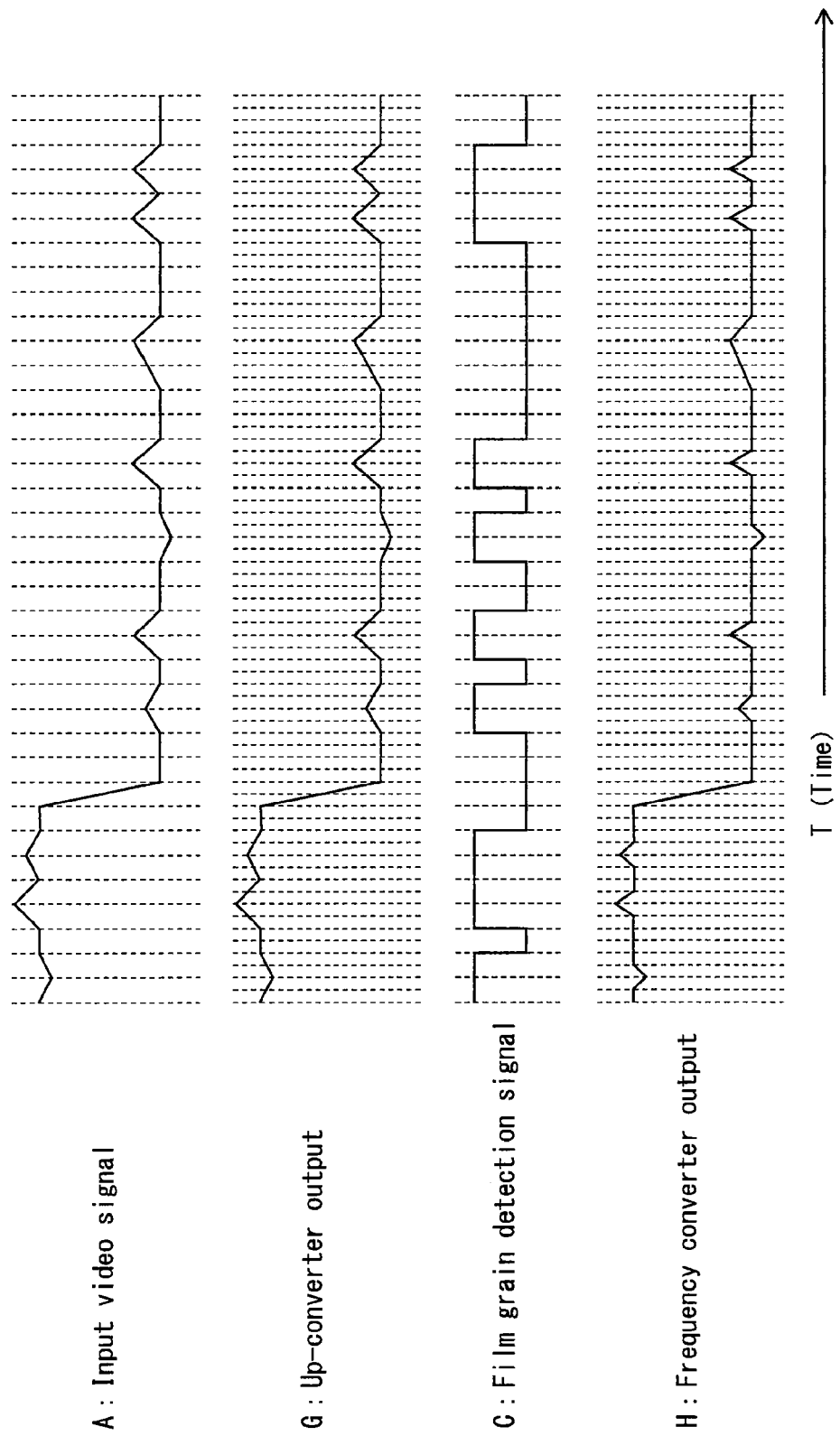
FIG. 11 is a timing chart showing changes in video signals that are output from constituent elements of the playback apparatus pertaining to embodiment 1.

FIG. 1 shows an internal structure of a playback apparatus pertaining to embodiment 1. In FIG. 1, the playback apparatus is constituted from an optical disc 1, an optical pickup 2, a motor 3, a video demodulation circuit 4, an up-converter 5, a film grain detection circuit 6, a frequency converter 7, a digital modulation circuit 8, and a terminal 9. FIG. 11 is a timing chart showing changes in video signals that are output from constituent elements of the playback apparatus pertaining to embodiment 1. The constituent elements of the playback apparatus are described below with reference to the timing chart.

1. Optical Disc 1

A video signal is recorded on the disc 1. The video signal recorded on the optical disc 1 has been compressed according to the MPEG-2 system (ITU-T Recommendation H.262/ISO/IEC13818-2).

2. Optical Pickup 2

The optical pickup 2 converts the signal recorded on the optical disc 1 into an electronic signal. Output from the optical pickup 2 is demodulated by the video demodulation circuit 4 and output as a video signal along with a synchronization signal necessary for playback.

3. Motor 3

The motor 3 rotates the optical disc 1 at a speed suitable for playback.

4. Video Demodulation Circuit 4

The video demodulation circuit 4 performs error correction and the like on the output from the optical pickup 2, and demodulates the original video signal. The video signal obtained from the demodulation is input to the film grain detection circuit 6 and the up-converter 5. As described later, since the present playback apparatus is for transmitting uncompressed frame images through an HDMI transmission channel to a television, the present playback apparatus performs decoding processing on the frame images encoded according to the MPEG-2 encoding system, obtains a video signal including the frame images, and outputs the video signal. For this reason, a demultiplexer and a video decoder necessary for decoding the frame images encoded according to the MPEG-2 encoding system are implemented in the video demodulation circuit 4.

5. Up-Converter 5

The up-converter 5 converts the output of the video demodulation circuit 4 into a video signal having a higher resolution. Specifically, the signal is converted so as to have a resolution of 1080 vertical lines and 1920 horizontal pixels. The first stage of FIG. 11 shows the video signal before the up-conversion, and the second stage shows the video signal after the up-conversion. Grid spacing of pixel clocks in the second stage is denser than in the first stage. This indicates that an image up-converted by the up-converter 5 is expressed with use of a larger number of pixels.

6. Film Grain Detection Circuit 6

The film grain detection circuit 6 detects film grains contained in the original video signal. Here, the video signal refers to a signal electrically converted from a video originally recorded on a film. The film grains refer to images of silver salt particles on a film. These particle images forms small-amplitude signals in a particular component of the video signal. The video signal includes a luminance component domain and a color difference component domain. The film grains are the small-amplitude components in these domains. The film grain detection circuit 6 measures the amplitude of the small-amplitude signal in these domains, and detects the small-amplitude components as the film grains.

7. Frequency Converter 7

The frequency converter 7 converts the spatial frequency of the video signal output from the up-converter 5 to a higher frequency and outputs it only while the film grain detection circuit 6 is detecting film grains. The second stage in FIG. 11 shows output of the up-converter 5, and the third stage shows output of the film grain detection circuit 6. The fourth stage shows output of the frequency converter 7 where the output is converted so as to have a high frequency only while output of the film grain detection circuit 6 is "1", which is while film grains are being detected.

8. Digital Modulation Circuit 8

The digital modulation circuit 8 modulates, and converts into a suitable format for transmission, the output of the frequency converter 7. The output of the frequency converter 7 thus acquired is modulated by the digital modulation circuit 8 into an HDMI-format digital video signal. The video signal is output by the terminal 9 and displayed on a monitor that is not depicted.

9. Terminal 9

The terminal 9 is compliant with HDMI (High Definition Multimedia Interface) standards, and includes a serial transmission channel for intercommunication regulated by both standards VESA/E-DDC and EIA/CEA 861-B, in addition to a digitally modulated video signal transmission channel.

FIG. 2 shows the number of pixels in an input image and the number of pixels in an output image, pertaining to embodiment 1. As shown in FIG. 2, according to the playback apparatus pertaining to embodiment 1, the input image, namely the video signal recorded on the optical disc 1, is a standard video signal having 480 vertical lines and 720 horizontal pixels. The up-converter 5 converts this video signal into a high definition video signal of 1080 vertical lines and 1920 horizontal pixels, and outputs it.

Details of the Up-Converter 5

Figure 3:
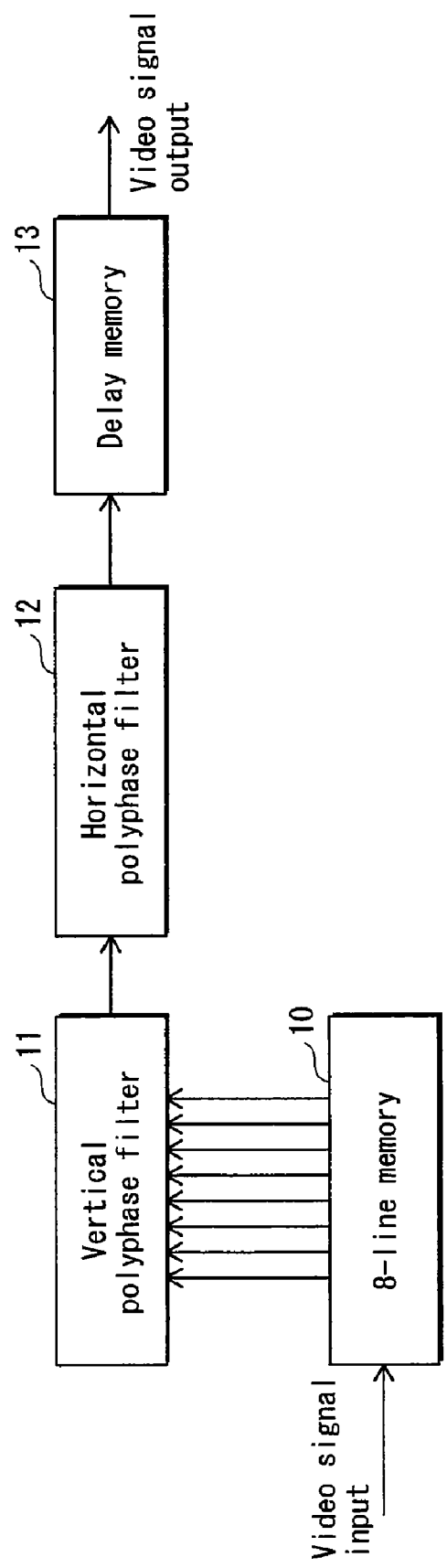
FIG. 3 shows an internal structure of an up-converter 5 pertaining to embodiment 1.

The following describes the details of the up-converter 5 with reference to FIG. 3. FIG. 3 shows an internal structure of the up-converter 5 of the playback apparatus pertaining to embodiment 1. As shown in FIG. 3, the up-converter 5 is constituted from an 8-line memory 10, a vertical polyphase filter 11, a horizontal polyphase filter 12, and a delay memory 13.

Detail 1: 8-Line Memory 10

The 8-line memory 10 includes eight line memories. Such line memories are connected in a series, and each line memory corresponds to one horizontal line in a video signal output from the video demodulation circuit 4. Also, output of the line memories is input to the vertical polyphase filter 11.

Detail 2: Vertical Polyphase Filter 11

Figure 4A:
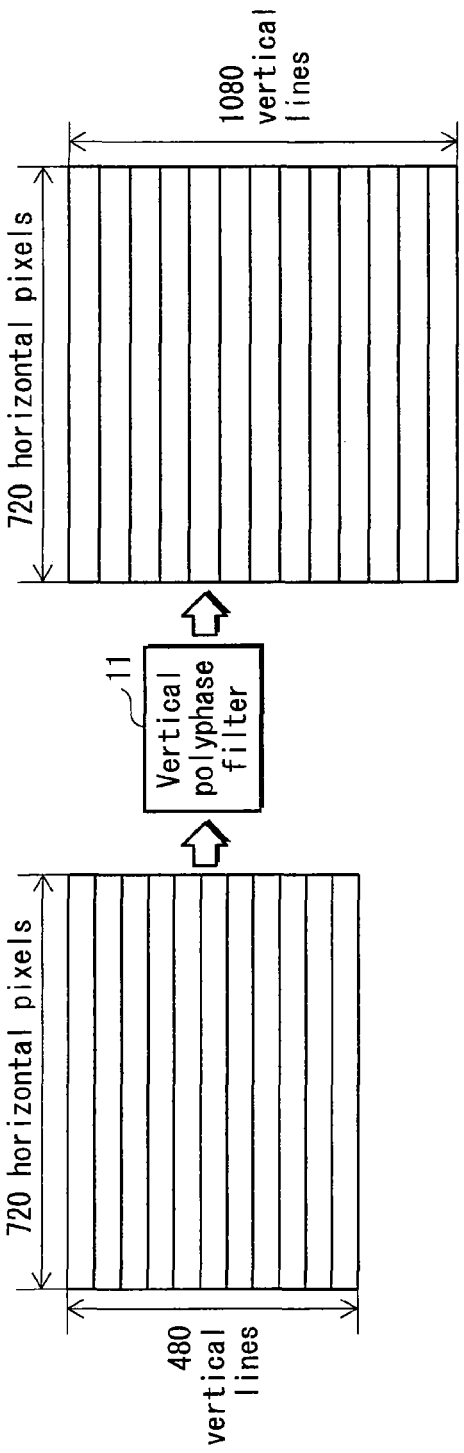
FIG. 4A shows a frame image before and after conversion by a vertical polyphase filter 11.

The vertical polyphase filter 11 receives an input of eight video signals, which are a 1-horizontal line delay video signal, a 2-horizontal line delay video signal, a 3-horizontal line delay video signal, a 4-horizontal line delay video signal, a 5-horizontal line delay video signal, a 6-horizontal line delay video signal, a 7-horizontal line delay video signal, and an 8-horizontal line delay video signal. The vertical polyphase filter 11 performs vertical interpolation on these eight video signals, converts the original video signal from 480 vertical lines to 1080 vertical lines, and outputs the converted video signal to the horizontal polyphase filter 12. FIG. 8A shows a frame image before and after conversion by the vertical polyphase filter 11. As shown in FIG. 4A, the resolution of the original video signal, 480 vertical lines and 720 horizontal pixels, is converted into the high definition video signal of 1080 vertical lines and 720 horizontal pixels. Here, generating one line based on the eight lines before and after is done to generate lines that are not in the original video with use of correlations between the lines.

Detail 3: Horizontal Polyphase Filter 12

Figure 4B:
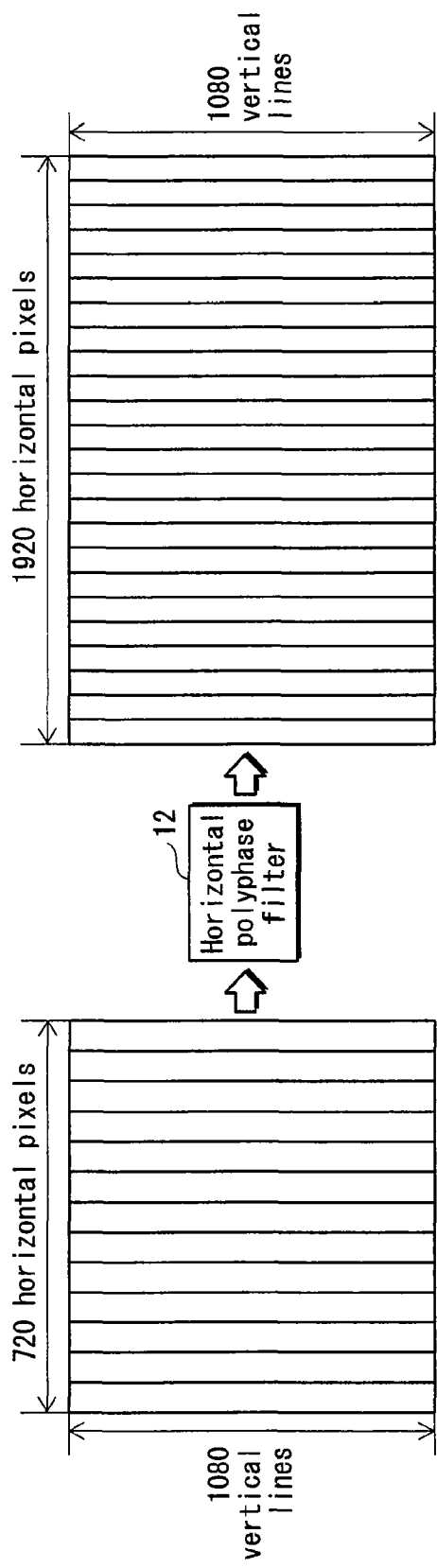
FIG. 4B shows a frame image before and after conversion by a horizontal polyphase filter 12.

The horizontal polyphase filter 12 includes an 8-tap polyphase filter, performs horizontal interpolation, converts the 720 horizontal pixels of the original video signal into 1920 pixels, and outputs the converted signal to the delay memory 13. FIG. 4B shows a frame image before and after conversion by the horizontal polyphase filter 12. As shown in FIG. 8B, the 1080 vertical lines and 720 horizontal pixels of the original video signal are converted into the high-definition video signal of 1080 vertical lines and 1920 horizontal pixels.

Detail 4: Delay Memory 13

The delay memory 13 provides a delay of a predetermined time to the output from the horizontal polyphase filter 12. In regards to this delay, there is precisely one frame of delay from the input to the output of the video signal on which the resolution conversion has been performed. During the delay, a vertical synchronization signal of the output video is output to the frequency converter 7.

This completes the description of the up-converter 5.

Details of the Film Grain Detection Circuit 6

Figure 5:
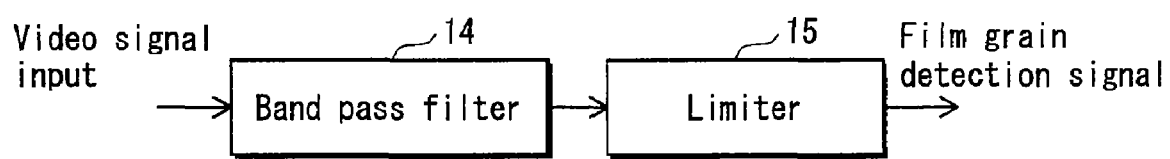
FIG. 5 shows an internal structure of a film grain detection circuit 6 pertaining to embodiment 1.
Figure 7:
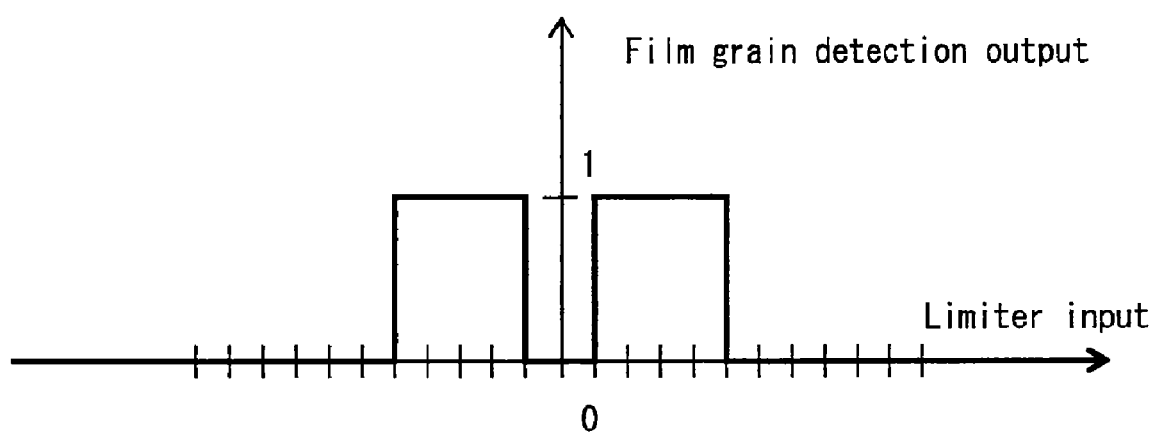
FIG. 7 shows a characteristic of a limiter 15 pertaining to embodiment 1.
Figure 8:
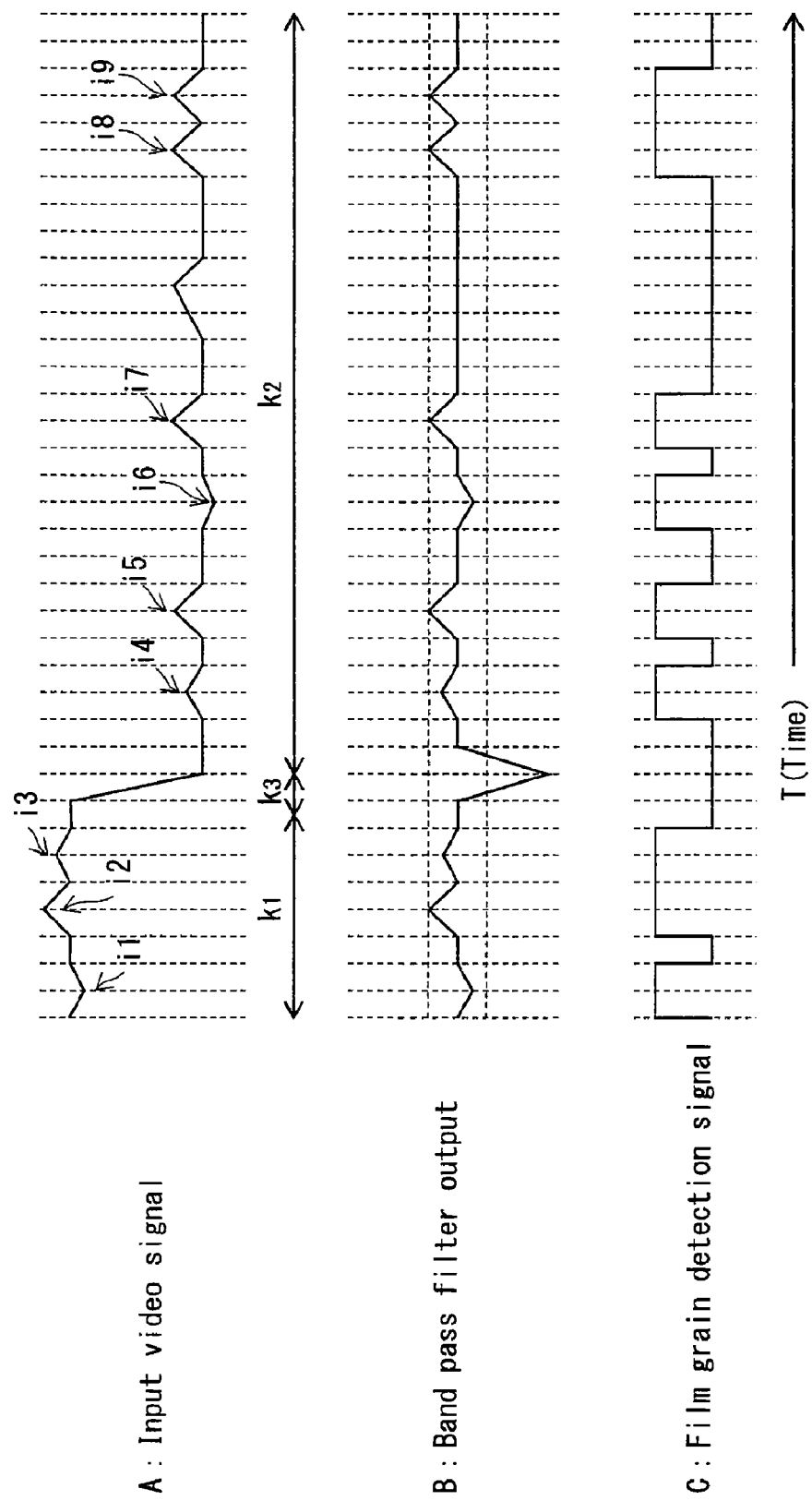
FIG. 8 is a timing chart showing a contrast between a signal input to the film grain detection circuit 6 pertaining to embodiment 1 and signals output from constituent elements.

The following describes an internal structure of the film grain detection circuit 6 with reference to FIG. 5. FIG. 5 shows the internal structure of the film grain detection circuit 6 pertaining to embodiment 1. As shown in FIG. 5, the film grain detection circuit 6 is constituted from a band pass filter 14 and a limiter 15. FIG. 8 is a timing chart showing a contrast between a signal input to the film grain detection circuit 6 and signals output from the constituent elements. Hereinafter, the film grain detection circuit 6 is described with reference to the timing chart. Other referenced drawings are FIGS. 6 and 7.

Detail 1: Band Pass Filter 14

Figure 6A:
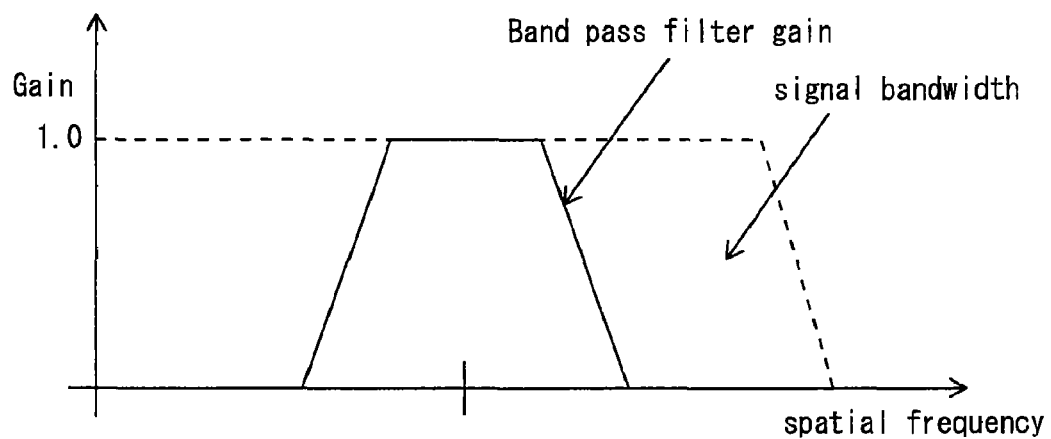
FIG. 6A shows a characteristic of a band pass filter 14 pertaining to embodiment 1.
Figure 6B:
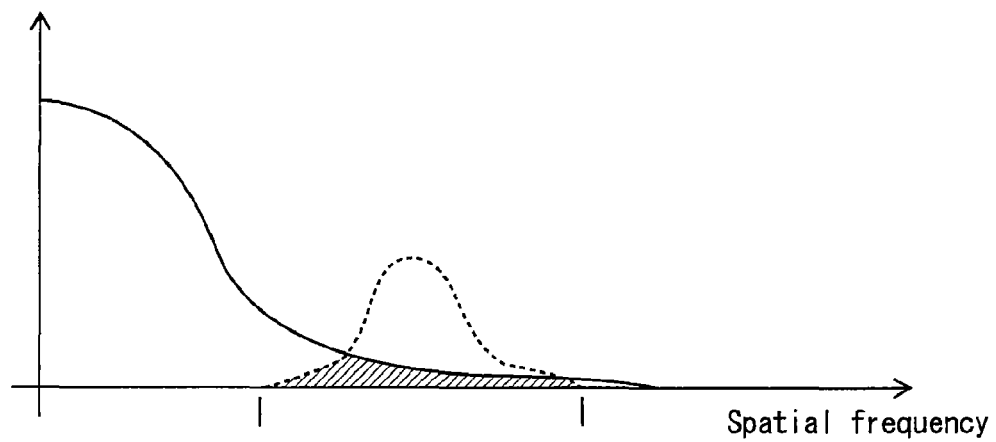
FIG. 6B shows a video signal represented in terms of a spatial frequency.

The video signal that has been demodulated by the video demodulation circuit 4 is input to the band pass filter 14. FIG. 6A shows a characteristic of the band pass filter of the playback apparatus pertaining to embodiment 1. The horizontal axis is the frequency axis, and the vertical axis shows the frequency gain. The band pass filter 14 has a characteristic of transmitting only the midrange of input video signals. Since the midrange corresponds to the component in the original video signal in which the film grains are mainly distributed, the band pass filter only transmits that component. Specifically, the video signal represented in terms of the spatial frequency is shown in FIG. 6B. The video originally recorded on a film has a peak in the direct-current frequency range, as denoted in the solid line in FIG. 6B. On the contrary, the particle images of the film grain have a peak in a frequency range that is different from the direct-current frequency range, as denoted in the broken line in FIG. 6B. The band pass filter transmits this frequency range of the video signal. The video signal that passed through the band pass filter 14 is input to the limiter 15.

Stages 1 and 2 of FIG. 8 show a contrast between the video signal input to the band pass filter 14 and the output therefrom at the time of the input. In the first stage, the peaks i1, i2, i3, i4, and i5 in periods k1 and k2 are film grain. Since the video signal passes through the band pass filter 14, the film grain and the transition point k3 between period k1 and period k2 appear in the output signal of the band pass filter 14.

Detail 2: Limiter 15

The limiter 15 outputs "1" only when the video signal contains a particular small-amplitude component, and otherwise outputs "0". This is because film grain mainly has a small amplitude. FIG. 7 shows a characteristic of the limiter of the playback apparatus pertaining to embodiment 1. The horizontal axis shows the output of the band pass filter 14, and is represented in amplitude values showing changes in the level of the video signal. The vertical axis shows the output of the limiter 15 with respect to the output of the band pass filter 14.

In other words, while the output of the limiter 15 is "1", the particular amplitude signal component, consisting of the film grain contained in the original video signal, is being extracted. The output from the film grain detection circuit 6 that was obtained in this way is input to the frequency converter 7. Stages 2 and 3 of FIG. 8 show a contrast between the signal input to the limiter 15 and a signal output therefrom. Here, the output of the limiter is "1" only when the particular amplitude component of the second stage is less than or equal to a limit value indicated in FIG. 7, and, as shown in the third stage, it is output from the film grain detection circuit 6.

Here, to prevent the signal component cut off by the band pass filter 14 and the direct current component from being misdetected as film grain, the limiter 15 is configured to output "0" when the output from the band pass filter 14 is near to 0.

This completes the description of the details of the film grain detection circuit 6.

Details of the Frequency Converter 7

Figure 9:
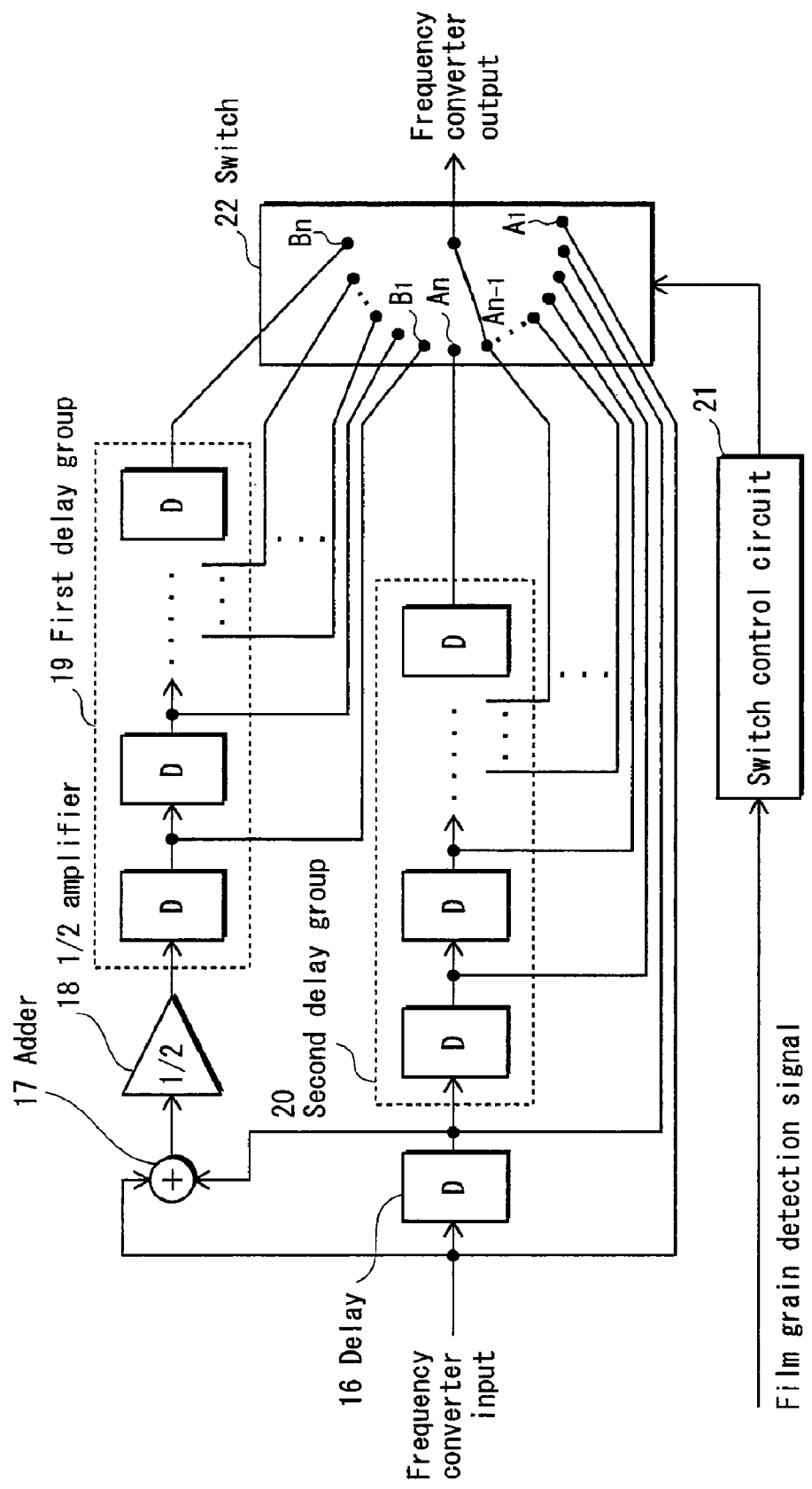
FIG. 9 shows an internal structure of a frequency converter 7.

The following describes the details of the frequency converter 7, with reference to FIG. 9. FIG. 9 is an internal structure of a frequency converter 7. The frequency converter 7 includes a delay 16, an adder 17, a ½ amplifier 18, a first delay group 19, a second delay group 20, a switch control circuit 21, and a switch 22. Also, the frequency converter 7 has "a frequency converter input" terminal, a film grain detection signal input" terminal, and a "frequency converter output" terminal.

Figure 10:
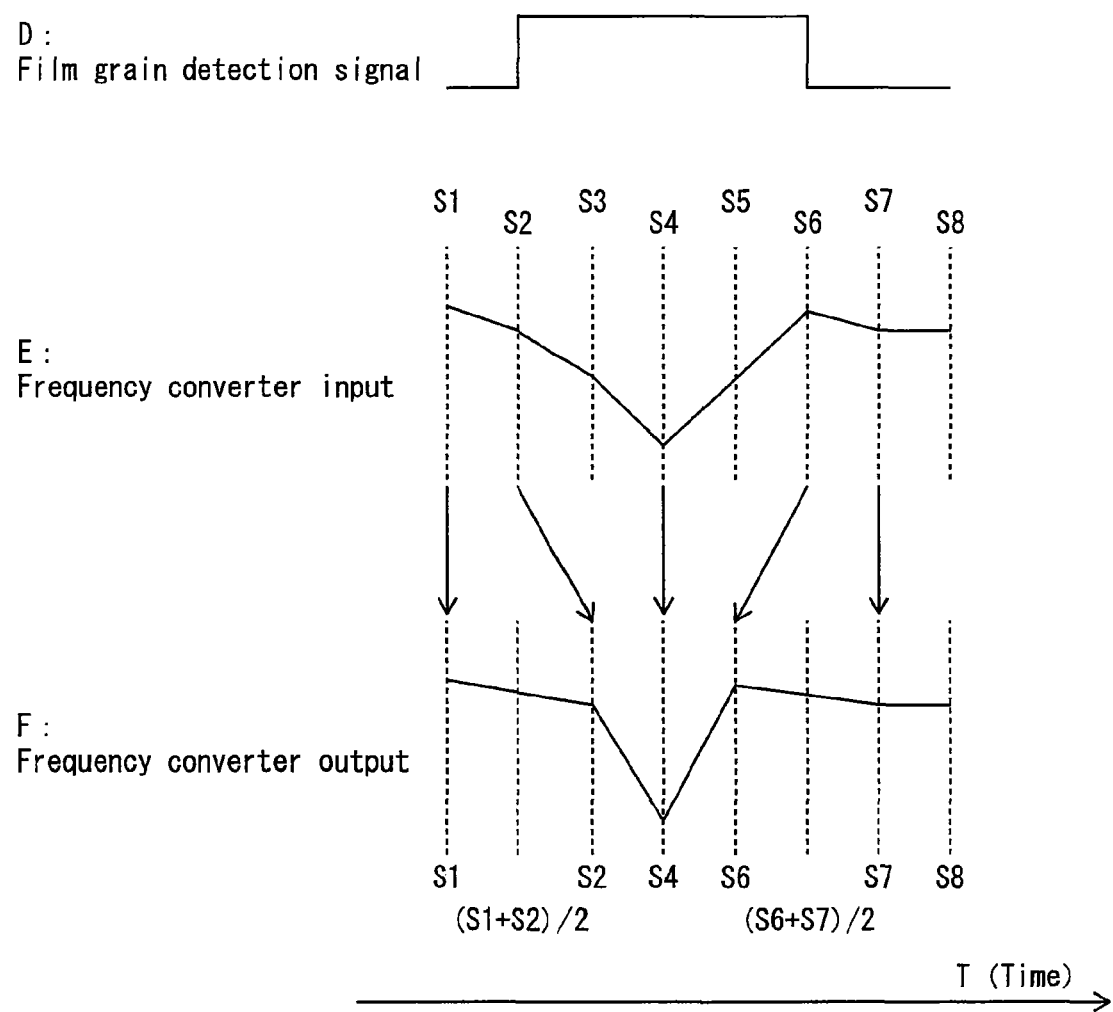
FIG. 10 is a timing chart showing an operation of the frequency converter 7 pertaining to embodiment 1.

The "frequency converter input" is a terminal into which a video signal output from the up-converter 5 is input. The "film grain detection signal input" is a terminal into which a signal output from the film grain detection circuit 6 is input. The frequency converter 7 plays a roll of converting the spatial frequency of the film grain signal component included in the original video signal. FIG. 10 is a timing chart showing a contrast between a signal input signal to the frequency converter 7 and signals output from constituent elements. Hereinafter, the frequency converter 7 is described with reference to this timing chart together with FIG. 9.

Detail 1: Delay 16, Adder 17 and ½ Amplifier 18

The delay 16 provides a delay of one pixel clock to the video signal input thereto. The adder 17 calculates the sum of the input and the output of the delay 16, and inputs the result of the calculation to the ½ amplifier 18. The ½ amplifier 18 reduces the output from the adder 17 to half. That is, the ½ amplifier calculates the average between the input to the frequency converter 7, and the output from the delay namely the input to the frequency converter 7 one pixel clock before. In other words, the ½ amplifier 18 calculates the average of the values of adjacent pixels.

Detail 2: First Delay Group 19

The first delay group 19 provides a delay to the average value of the adjacent pixels calculated by the ½ amplifier 18, according to the pixel clock, and each of the group provides a delayed output to the switch 22.

Detail 3: Second Delay Group 20

The second delay group 20 provides a delay to the input to the frequency converter 7 according to the pixel clock, and each of the group provides a delayed output to the switch 22.

Detail 4: Switch Control Circuit 21 and Switch 22

The switch 22 is a multi-throw switch that connects any one among connection points A1 to An and B1 to Bn to the output connection point. The connection points A1 to An are of video signals to each of which a delay of one pixel clock is provided. The connection points B1 to Bn are of the average values of adjacent pixels to each of which a delay of one pixel clock is provided.

The switch control circuit 21 controls the switch 22 to thin out the video signals according to the film grain detection signal corresponding to five pixel clocks shown at the top of FIG. 10. Specifically, during the period corresponding to five pixel clocks S2, S3, S4, S5 and S6 in which film grain is detected, the switch control circuit 21 causes the switch 22 to connect to the point B1 at S2, to the point A4 at S4, to the point A6 at S5, and to the point B6 at S6.

As a result, as shown in the second stage of FIG. 10, S3 is removed and S2 is moved instead by one sample, and then the average of S1 and S2, namely (S1+S2)/2, is inserted to the sample position where S2 existed in the second stage. Also, S5 in the second stage of FIG. 10 is removed and S6 is moved instead by one sample, and then the average of S6 and S7, namely (S6+S7)/2, is inserted to the sample position where S6 existed in the second stage. As a result, the frequency converter output shown in the third stage of FIG. 10 will be a signal whose frequency has been converted to be higher than the frequency of the frequency converter input signal shown in the second stage.

As described above, the switch control circuit 21 selects from among the delayed outputs from the first delay group 19 and the delayed outputs from the second delay group 20, which are input to the switch 22. While no film grain is being detected, the switch control circuit 21 controls the switch 22 to output the frequency converter input as the frequency converter output without change.

In the case where the detection of film grain continues for longer than 6 pixel clocks, the switch control circuit 21 repeatedly controls the switch 22 such that the portion at the fifth pixel clock within the grain film detection signal for five pixel clocks is regarded as the start point of the film grain detection for the subsequent five pixel clocks.

This completes the description of the frequency converter 7.

Video Signal Passed Through the Frequency Converter 7

The following describes the video signal to be transmitted by the above-explained playback apparatus to the monitor, with reference to FIG. 11.

FIG. 11 is a timing chart showing changes in video signals that are output from constituent elements of the playback apparatus pertaining to embodiment 1.

As described above, the first stage of FIG. 11 shows the video signal before the up-conversion, and the second stage shows the video signal after the up-conversion. A comparison between the first stage and the second stage shows that there is no change in the waveform. The third stage shows a period in which the film grain detection circuit 6 is detecting film grain. As the fourth stage shows, the frequency of small-amplitude signal, output from the frequency converter 7 in the period where film grain is detected, is converted to be a high frequency.

SUMMARY

The following describes changes in the content of an SD image containing film grains when up-conversion is performed, and when the spatial frequency of the film grains has been converted to a higher frequency after up-conversion of the SD image.

FIG. 12A shows how an SD image containing noise changes when up-conversion is performed. The left side of FIG. 12A shows the SD image before the up-conversion, and the right side shows the HD image after the up-conversion. Film grains that are expressed on the left side by one pixel are expressed on the right side by a plurality of pixels, 2 vertical pixels by 2 horizontal pixels.

FIG. 12B shows the SD image of FIG. 12A before the up-conversion and an exemplary HD image after up-conversion when displayed on a television of the same size. The left side of the present drawing shows the SD image, and the right side shows the HD image. Since the film grains that are expressed on the left side by one pixel are expressed on the right side by a plurality of pixels, 2 vertical pixels by 2 horizontal pixels, the size of the film grain in proportion to the image as a whole does not change, and the user does not have a tangible sense that the image became high-definition as a result of the up-conversion.

FIG. 13A contrasts how an SD image changes when the frequency of film grains has been converted after up-conversion of the SD image. The left side of the present drawing shows the SD image before up-conversion, and the right side shows the HD image after up-conversion. Since the signal in which the frequency of the film grains has been converted is shown instead of the film grains that are expressed on the left side by one pixel, the HD image on the right side shows smaller film grains.

FIG. 13B shows the SD image before the up-conversion of FIG. 13A and an exemplary display of an HD image after up-conversion when displayed on a television of the same size. The left side of the present drawing is the SD image, and the right side is the HD image. Since the film grains that are represented on the left side as one pixel is represented instead on the right side as smaller film grains, a size ratio of the film grain to the image as a whole is smaller, thus giving the user a tangible sense that the image became high-definition as a result of the up-conversion.

According to the present embodiment described above, film grains are beforehand detected from the video signal, and the frequency of the film grains is converted to be in a higher range in the output of the up-converter that converts the video signal to high-definition. This provides the benefit of increasing the high-definition feel of the up-converted video signal.

Embodiment 2

Figure 14:
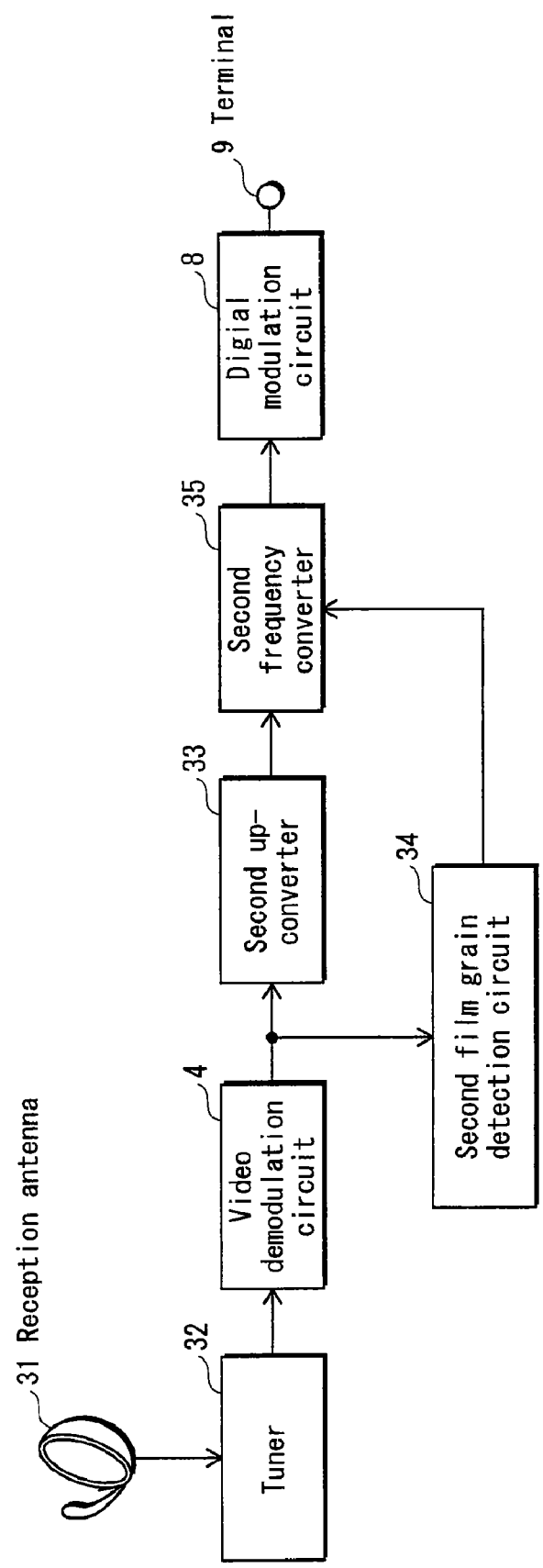
FIG. 14 shows an internal structure of a playback apparatus pertaining to embodiment 2.

Although embodiment 1 described a case in which the optical disc 1 is the input source of the video signal, the present embodiment is an improvement for a case in which the input source of the video signal is a broadcast wave. FIG. 14 shows an internal structure of a playback apparatus pertaining to embodiment 2. A comparison with the internal structure in FIG. 1 shows that in FIG. 14, the optical disc 1, the optical pickup 2, and the motor 3 have been replaced by a reception antenna 31 and a tuner 32. Although the video demodulation circuit 4 is the same as embodiment 1, the up-converter 5, the film grain detection circuit 6 and the frequency conversion circuit 7 have been replaced by a second up-converter 33, a second film grain detection circuit 34 and a second frequency conversion circuit 35. FIGS. 21 and 22 are timing charts showing how a video signal changes when output from constituent elements of the playback apparatus of embodiment 2.

1. Reception Antenna 31

The reception antenna 31 receives a broadcast and converts the broadcast into an electronic signal. The video signal received by the reception antenna 31 has been compressed according to the MPEG-2 system (ITU-T Recommendation H.262/ISO/IEC13818-2).

2. Tuner 32

The tuner 32 selects a desired broadcast from the output of the reception antenna. In FIG. 14, a signal recorded in the broadcast received by the antenna 31 is selected by the tuner 32, demodulated by the video demodulation circuit 4, and is output as a video signal. The original video signal that was demodulated in this way is input to the second film grain detection circuit 34 and the second up-converter 33.

FIG. 15 shows the number of pixels in an input image and the number of pixels in an output image, pertaining to embodiment 2. As shown in FIG. 15, the input image, namely the video signal that is being broadcast is a standard video signal having 480 vertical lines and 720 horizontal pixels. The up-converter 5 converts this video signal into a high definition video signal of 720 vertical lines and 1280 horizontal pixels, and outputs it.

3. Second Up-Converter 33

The second up-converter 33 converts the output of the video demodulation circuit 4 into a video signal having a higher resolution. Specifically, the signal is converted so as to have a resolution of 720 vertical lines and 1280 horizontal pixels. The first stage of FIG. 21 shows the video signal before the up-conversion, and the second stage shows the video signal after the up-conversion. Grid spacing of pixel clocks in the second stage is denser than in the first stage. This indicates that an image up-converted by the second up-converter 33 is expressed with use of a larger number of pixels.

4. Second Film Grain Detection Circuit 34

The second film grain detection circuit 34 detects film grains contained in the original video signal. As explained for embodiment 1, film grains in the video signal are small-amplitude signals in a particular spatial frequency component of the video signal. However, film grains originally are signal components that are separate from each other for each frame. Thus the second film grain detection circuit 34 measures the amplitude of the small-amplitude signal in the video domain having the particular spatial frequency among the video signal components having no correlation between frames, and detects such small-amplitude signal as film grains.

5. Second Frequency Converter 35

The second frequency converter 35 converts the spatial frequency of the video signal output from the second up-converter 33 to a higher frequency and outputs it only while the second film grain detection circuit 34 is detecting film grain. The second stage in FIG. 21 shows output of the second up-converter 33, and the fourth stage in FIG. 22 shows output of the film grain detection circuit 6. The fifth stage in FIG. 22 shows output of the second frequency converter 35. The second frequency converter 35 converts the spatial frequency of the output from the second up-converter 33 to be a higher frequency only while output of the second film grain detection circuit 34 is "1", which is while film grains are being detected.

This completes the description of the playback apparatus of embodiment 2. The following describes the details of the second up-converter 33 with reference to FIGS. 16 and 17.

Details of the Second Up-Converter 33

Figure 16:
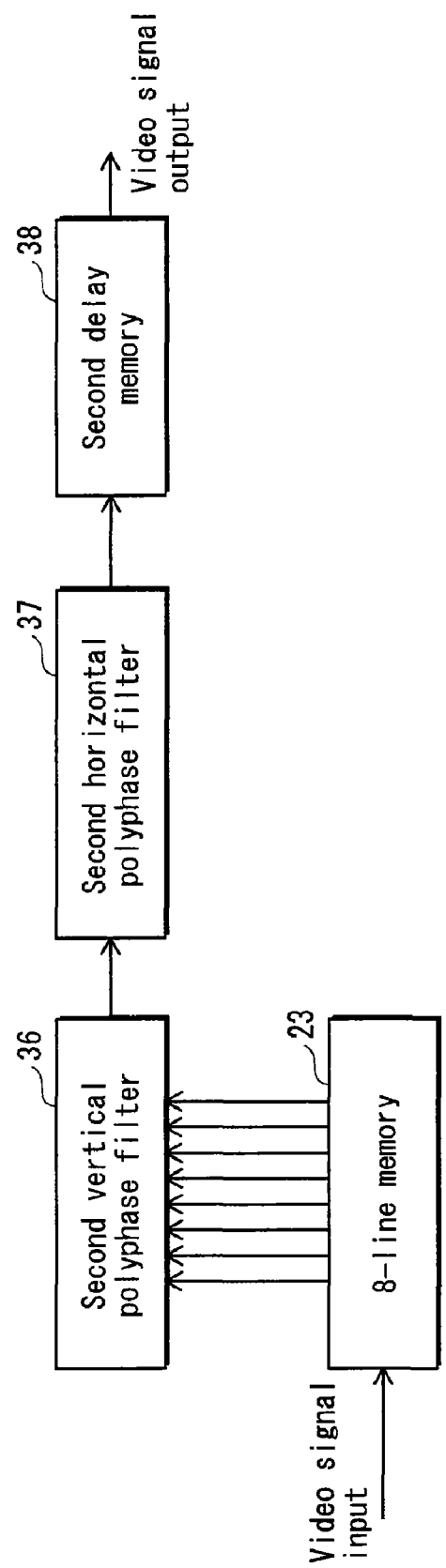
FIG. 16 shows an internal structure of an up-converter 33 pertaining to embodiment 2.

FIG. 16 shows an internal structure of the second up-converter 33 of the playback apparatus pertaining to embodiment 2. As shown in FIG. 16, the second up-converter 33 is constituted from an 8-line memory 23, a second vertical polyphase filter 36, a second horizontal polyphase filter 37, and a second delay memory 38.

Detail 1: 8-Line Memory 23

The 8-line memory 23 includes eight line memories. Such line memories are connected in a series, and each line memory corresponds to one horizontal line in a video signal output from the video demodulation circuit 4. Also, output of the line memories is input to the second vertical polyphase filter 36.

Detail 2: Second Vertical Polyphase Filter 36

Figure 17A:
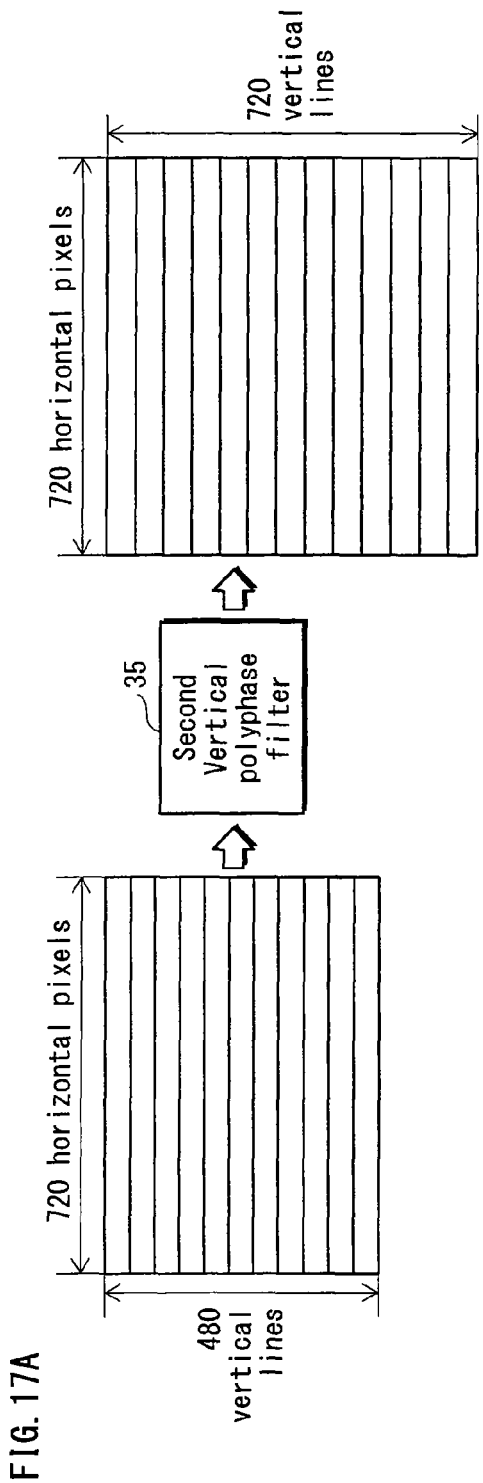
FIG. 17A shows a frame image before and after conversion by a second vertical polyphase filter 33.

The second vertical polyphase filter 36 receives an input of eight video signals, which are a 1-horizontal line delay video signal, a 2-horizontal line delay video signal, a 3-horizontal line delay video signal, a 4-horizontal line delay video signal, a 5-horizontal line delay video signal, a 6-horizontal line delay video signal, a 7-horizontal line delay video signal, and an 8-horizontal line delay video signal. The second vertical polyphase filter 36 performs vertical interpolation on these eight video signals, converts the original video signal from 480 vertical lines to 720 vertical lines, and outputs the converted video signal to the second horizontal polyphase filter 37. FIG. 17A shows a frame image before and after conversion by the second vertical polyphase filter 36. As shown in FIG. 17A, the resolution of the original video signal, 480 vertical lines and 720 horizontal pixels, is converted into the high definition video signal of 720 vertical lines and 720 horizontal pixels. Here, generating one line based on the eight lines before and after is done to generate lines that are not in the original video with use of correlations between the lines.

Detail 3: Second Horizontal Polyphase Filter 37

Figure 17B:
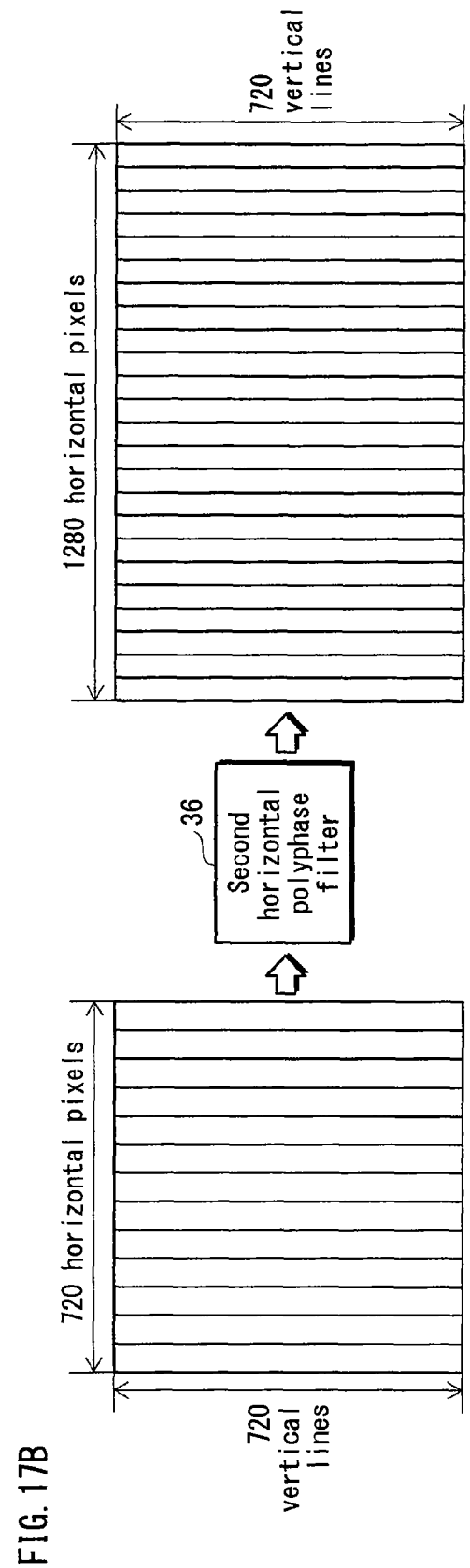
FIG. 17B shows a frame image before and after conversion by a second horizontal polyphase filter 37.

The second horizontal polyphase filter 37 includes an 8-tap polyphase filter, performs horizontal interpolation, converts the 720 horizontal pixels of the original video signal into 1280 pixels, and outputs the converted signal to the second delay memory 38. FIG. 17B shows a frame image before and after conversion by the second horizontal polyphase filter 37. As shown in FIG. 17B, the 720 vertical lines and 720 horizontal pixels of the original video signal are converted into the high-definition video signal of 720 vertical lines and 1280 horizontal pixels.

Detail 4: Second Delay Memory 38

The second delay memory 38 provides a delay of a predetermined time to the output from the second horizontal polyphase filter 37. In regards to this delay, there is precisely one frame of delay from the input to the output of the video signal on which the resolution conversion has been performed. During the delay, a vertical synchronization signal of the output video is output to the second frequency converter 35.

The first stage of FIG. 21 shows the video signal before the up-conversion, and the second stage shows the video signal after the up-conversion. A comparison between the first stage and the second stage shows that grid spacing in the second stage is denser than in the first stage. This indicates that an image up-converted by the second up-converter 33 is expressed with use of a larger number of pixels. Also, as shown in the second stage, small-amplitude components exit in the periods k1 and k2, respectively. This means that the film grain has been up-converted without change.

This completes the description of the second up-converter 33 pertaining to embodiment 2. The following describes details of the second film grain detection circuit 34 of embodiment 2 with reference to FIGS. 18 and 19.

Details of the Second Film Grain Detection Circuit 34

Figure 18:
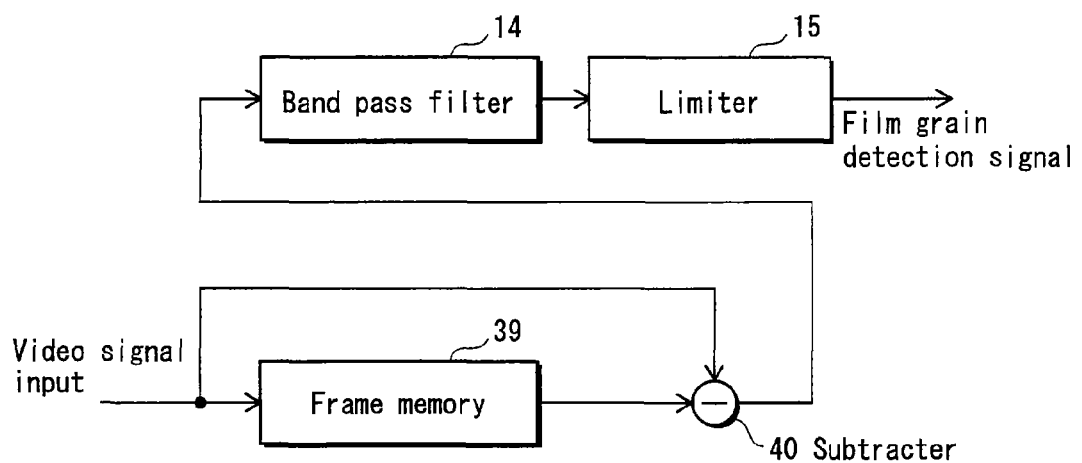
FIG. 18 shows an internal structure of a second film grain detection circuit 34 pertaining to embodiment 2.
Figure 19:
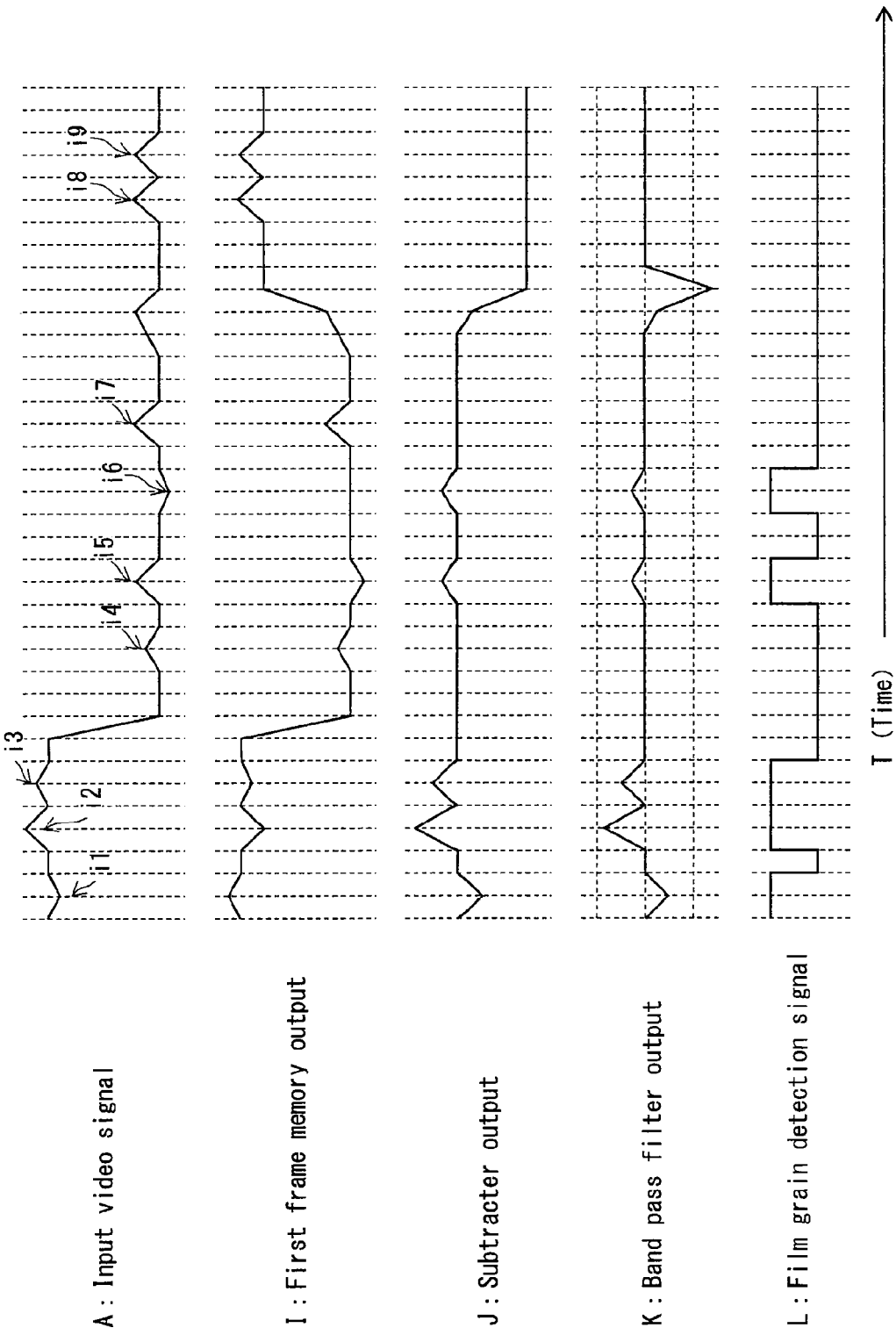
FIG. 19 is a timing chart showing a contrast between a signal input to the second film grain detection circuit 34 pertaining to embodiment 2 and signals output from constituent elements.

FIG. 18 shows an internal structure of the second film grain detection circuit pertaining to embodiment 2 of the present invention. FIG. 19 is a timing chart showing a contrast between a signal input to the second film grain detection circuit 34 pertaining to embodiment 2 and signals output from constituent elements. A "video signal input" in FIG. 18 is a video signal that has been demodulated by the video demodulation circuit 4. The band pass filter 14 and the limiter 15 in FIG. 18 are the same as in embodiment 1. In the second film grain detection circuit 34 of FIG. 18, a frame memory 39 and a subtracter 40 exist upstream of the band pass filter 14, and the band pass filter 14 receives an input of the output from the subtracter 40.

The second film grain detection circuit 34 is characterized by extracting a particular frequency domain from an inter-frame differential signal of the video signal demodulated by the video demodulation circuit 4, unlike the film grain detection circuit 6, which extracts the particular frequency domain directly from the video signal demodulated by the video demodulation circuit 4 as indicated in embodiment 1.

Detail 1: Frame Memory 39

The frame memory 41 accumulates and outputs one frame of an input signal at a time. The first stage of FIG. 19 shows a video signal input to the second film grain detection circuit 34, and the second stage shows one frame of a video signal stored in and output from the frame memory 39.

Detail 2: Subtracter 40

The subtracter 40 obtains a difference between the video signal input and the frame memory 39 output. Accordingly, the video signal input to the band pass filter 14 is the difference between the original video signal and a signal having a delay of one frame. The third stage of FIG. 19 shows output from the subtracter 40. Among the peaks i1, i2, i3, i4, i5 and so on in the first stage, the peaks i4, i7, i8 and i9 are not film grains because there is correlation between frames, and thus does not appear in the output. In this way, the difference between the video signal and the video signal that is one frame previous is targeted by the band pass filter 14 for extraction of the particular frequency component. The fourth stage shows output from the band pass filter 14. Among the peaks i1, i2, i3, i4, i5 and so on in the fourth stage, only the peaks i1, i2, i3, i5 and i6, which have no correlation between frames, appear in the output.

The limiter 15 only extracts the small-amplitude signal component from the video signal that has passed through the band pass filter 14. The fifth stage of FIG. 19 shows a film grain detection signal output from the limiter 15 based on the output from the band pass filter 14 shown in the fourth stage. The output signal of the second film grain detection circuit 34 obtained in this way is input to the second frequency converter 35.

This completes the description of the second frequency converter 35. The following describes details of the second frequency converter 35, with reference to FIGS. 20, 21 and 22.

Details of the Second Frequency Converter 35

Figure 20:
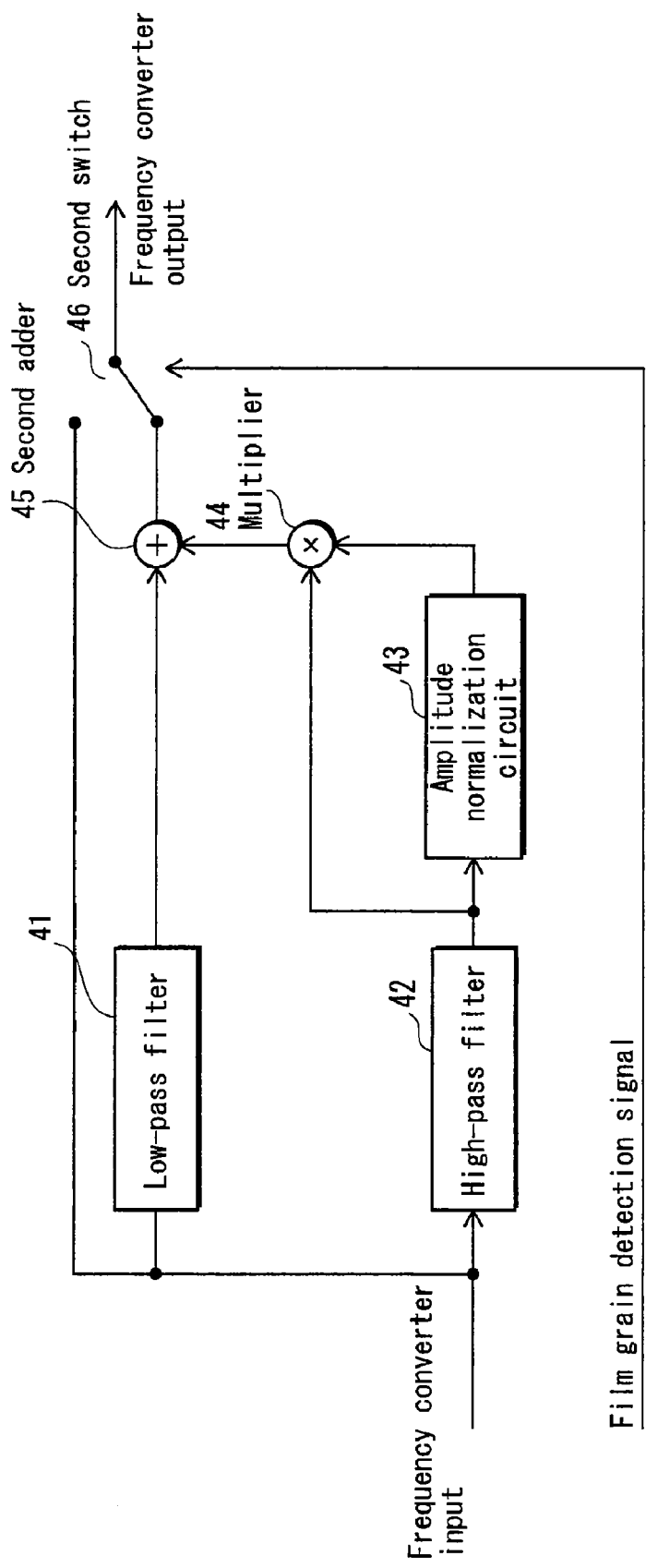
FIG. 20 shows an internal structure of a second frequency converter 35.

FIG. 20 shows an internal structure of the second frequency converter 35. The second frequency converter 35 includes a low-pass filter 41, a high-pass filter 42, an amplitude normalization circuit 43, a multiplier 44, a second adder 45 and a second switch 46. Also, the second frequency converter 35 has "a frequency converter input" terminal, a film grain detection signal input" terminal, and a "frequency converter output" terminal.

The "frequency converter input" is a terminal into which a video signal output from the second up-converter 33 is input. The "film grain detection signal input" is a terminal into which a signal output from the second film grain detection circuit 34 is input. The frequency converter 7 plays a roll of converting the spatial frequency of the film grain signal component included in the original video signal. FIG. 21 is a timing chart showing an operation of the second frequency converter 35. FIG. 22 is a timing chart showing a contrast between a signal output from the second film grain detection circuit 34 and a signal output from the internal constituent elements of the second frequency converter 35. Hereinafter, the frequency converter 7 is described with reference to these timing charts together with FIG. 20.

Detail 1: Low-Pass Filter 41

The low-pass filter 41 has the function to pass only low-frequency components of input video signals. In FIG. 21, the low-pass filter 41 outputs the signal shown in the third stage in response to the input signal shown in the second stage.

Detail 2: High-Pass Filter 42

The high-pass filter 42 has the function to pass only high-frequency components of input video signals. In FIG. 21, the high-pass filter 42 outputs the signal shown in the fourth stage in response to the input signal shown in the second stage.

Detail 3: Amplitude Normalization Circuit 43

The amplitude normalization circuit 43 is a circuit for obtaining the absolute values of an output signal from the high-pass filter 42, and giving a gain such that all the peak values of the output signal will be 1. In FIG. 21, the amplitude normalization circuit 43 outputs the signal shown in the fifth stage in response to the input signal from the high-pass filter 42 shown in the fourth stage.

Detail 4: Multiplier 44

The multiplier 44 multiplies the output from the high-pass filter 42 by the output signal from the amplitude normalization circuit 43. As explained above, the amplitude normalization circuit 43 has obtained the absolute values of an output signal from the high-pass filter 42, and has obtained a signal having the peaks normalized to be 1. Hence, the combination of the amplitude normalization circuit 43 and the multiplier 44 functions as a variable-gain amplifier that gives a gain "1" at the peaks of the output from high-pass filter 42 and gives a gain less than 1 at other than the peaks.

Thus, in FIG. 21, the multiplier 44 multiplies the input from the high-pass filter 42 shown in the fourth stage by the signal shown in the fifth stage, and outputs the signal shown in the first stage of FIG. 22.

Detail 5: Second Adder 45

The second adder 45 sums up the output from the low-pass filter 41 and the output from the multiplier 44. As a result, the second adder 45 outputs the signal shown in the third stage of FIG. 22. In comparison with the output from the second up-converter 33 shown in the second stage of FIG. 21, the waveform shows that only the frequency of the high-frequency components with a small amplitude are converted to be higher.

Detail 6: Second Switch 46

While the second film grain detection circuit 34 is detecting no film grain, the second switch 46 outputs the frequency converter input as the frequency converter output without change. While the second film grain detection circuit 34 is detecting film grain, the second switch outputs the output from the adder 45 as the frequency converter output. The frequency converter output is shown in the fifth stage of FIG. 22.

This completes the description of the details of the second frequency converter 35.

The following explains the video signal transmitted from the playback apparatus explained above to the monitor, with reference to FIG. 21 and FIG. 22 again.

As explained above, the first stage of FIG. 21 shows the video signal before the up-conversion, and the second stage shows the video signal after the up-conversion. A comparison between the first stage and the second stage shows that there is no change in the waveform. The fourth stage of FIG. 22 shows the period in which the film grain detection circuit 6 is detecting film grain. As the fifth stage of FIG. 22 shows, the frequency of small-amplitude signal, output from the frequency converter 7 in the period where film grain is detected (corresponding to the peaks i1, i2, i3, i5 and i6 in the first stage of FIG. 21), is converted to be a high frequency.

SUMMARY

The following describes changes in the content of an SD image containing film grains when up-conversion is performed, and when the spatial frequency of the film grains has been converted to a higher frequency after up-conversion of the SD image.

FIG. 23A shows how an SD image containing noise changes when up-conversion is performed. The left side of FIG. 23A shows the SD image before the up-conversion, and the right side shows the HD image after the up-conversion. Film grains that are expressed on the left side by one pixel are expressed on the right side by a plurality of pixels, 2 vertical pixels by 2 horizontal pixels.

FIG. 23B shows the SD image of FIG. 23A before the up-conversion and an exemplary HD image after up-conversion when displayed on a television of the same size. The left side of the present drawing shows the SD image, and the right side shows the HD image. Since the film grains that are expressed on the left side by one pixel are expressed on the right side by a plurality of pixels, 2 vertical pixels by 2 horizontal pixels, the size of the film grain in proportion to the image as a whole does not change, and the user does not have a tangible sense that the image became high-definition as a result of the up-conversion.

FIG. 24A contrasts how an SD image changes when the frequency of film grains has been converted after up-conversion of the SD image. The left side of the present drawing shows the SD image before up-conversion, and the right side shows the HD image after up-conversion. Since the signal in which the frequency of the film grains has been converted is shown instead of the film grains that are expressed on the left side by one pixel, the HD image on the right side shows smaller film grains.

FIG. 24B shows the SD image before the up-conversion of FIG. 24A and an exemplary display of an HD image after up-conversion when displayed on a television of the same size. The left side of the present drawing is the SD image, and the right side is the HD image. Since the film grains that are represented on the left side as one pixel is represented instead on the right side as smaller film grains, a size ratio of the film grain to the image as a whole is smaller, thus giving the user a tangible sense that the image became high-definition as a result of the up-conversion.

According to the present embodiment described above, film grains are beforehand detected from the difference between frames of the video signal, and the frequency of the film grains is converted to be in a higher range in the output of the up-converter that converts the video signal to high-definition. This provides the benefit of increasing the high-definition feel of the up-converted video signal.

In particular, since the embodiment detects film grains beforehand from the difference between frames of the video signal, the embodiment is capable of avoiding erroneously detecting components existing in the same domain as the spatial frequency domain of the film grains.

Embodiment 3

Figure 25:
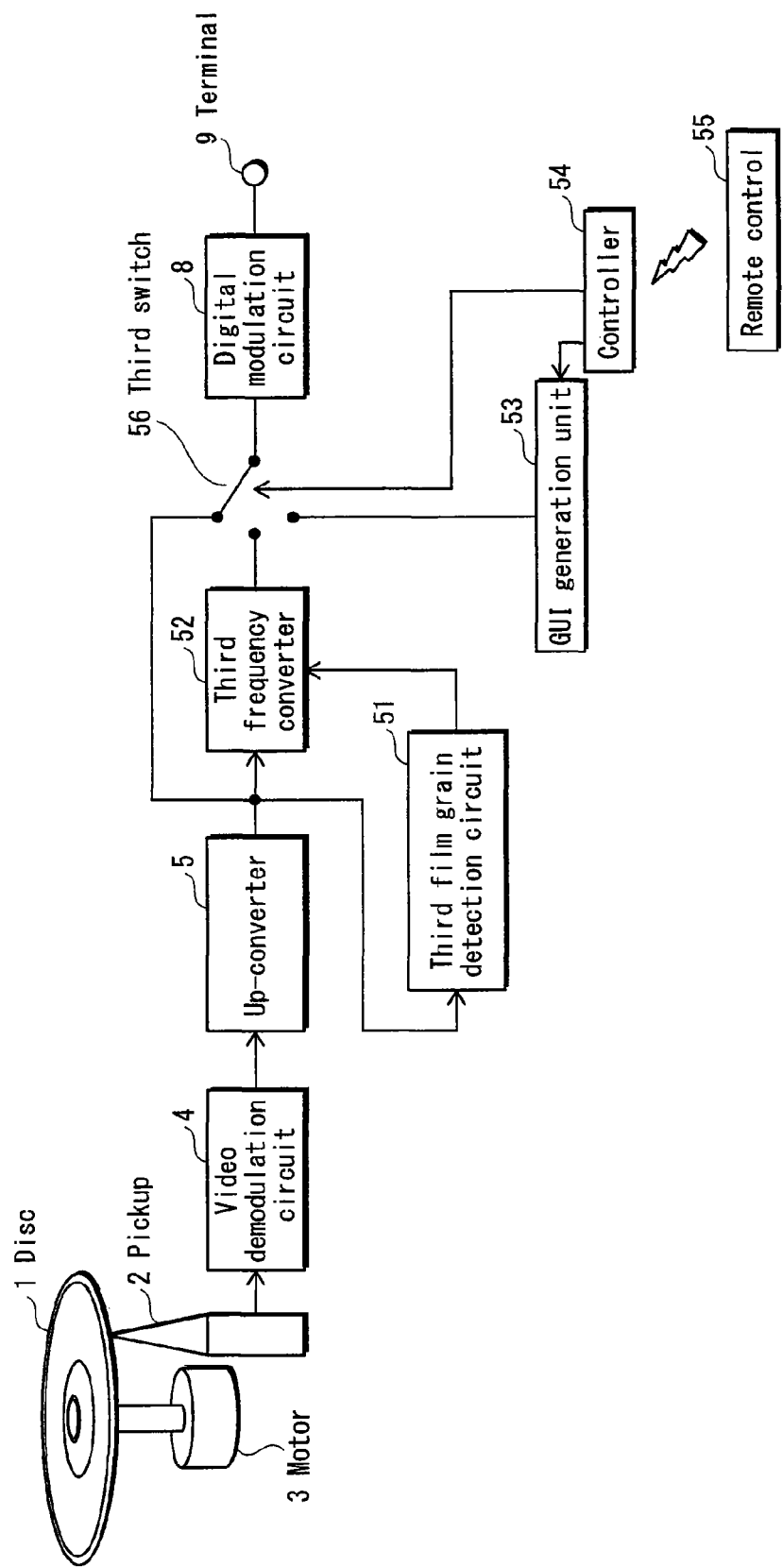
FIG. 25 shows an internal structure of a playback apparatus pertaining to embodiment 3.

FIG. 25 shows an internal structure of a playback apparatus pertaining to embodiment 3. FIG. 25 shows the internal structure of the playback apparatus pertaining to embodiment 3. This drawing is based on the internal structure of the playback apparatus pertaining to embodiment 1 shown in FIG. 1. FIG. 25 is different from FIG. 1 in that the film grain detection circuit 6 and the frequency converter 7 pertaining to embodiment 1 are respectively replaced with a third film grain detection circuit 51 and a third frequency converter 52, and that the playback apparatus pertaining to embodiment 3 further includes a GUI generator 53, a controller 54, a remote control 55 and a third switch 56. The other constituent elements, namely the optical disc 1, the optical pickup 2, the video demodulation circuit 4, the up-converter 5, the digital modulation circuit 8, and the terminal 9 are the same as those of embodiment 1. The following explains the modified elements.

Details of the Third Film Grain Detection Circuit 51

The film grain detection circuit 6 pertaining to embodiment 1 detects film grains from output of the video demodulation circuit 4. On the other hand, the third film grain detection circuit 51 pertaining to the present embodiment detects film grains from output of the up-converter 5.

Figure 26:
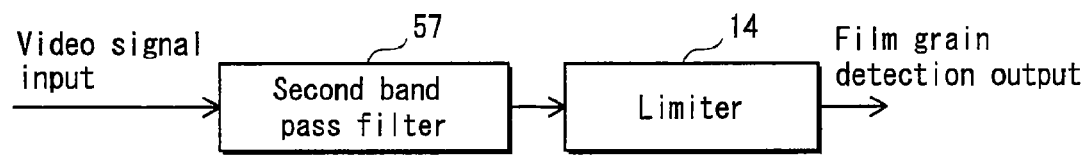
FIG. 26 shows an internal structure of a third film grain detection circuit 51 pertaining to embodiment 3.

The following describes the internal structure of the third film grain detection circuit 51 with reference to FIG. 26. FIG. 26 shows the internal structure of the third film grain detection circuit 51 pertaining to embodiment 3. As shown in FIG. 26, the third film grain detection circuit 51 is constituted from a second band pass filter 57 and a limiter 15. FIG. 28 is a timing chart showing a contrast between a signal input to the third film grain detection circuit 51 and signals output from the constituent elements. Hereinafter, the third film grain detection circuit 51 is described with reference to the timing chart.

Detail 1: Second Band Pass Filter 57

The video signal that has been demodulated by the up-converter 5 is input to the band pass filter 57. The film grain detection circuit 6 pertaining to embodiment 1 of the present invention detects film grains from output of the video demodulation circuit 4. On the other hand, the third film grain detection circuit 51 pertaining to the present embodiment detects film grains from output of the up-converter 5. Thus the pass-band of the band pass filter is changed according to the magnification ratio of the up-converter. Specifically, the pass-band of the band pass filter is moved to the side of a lower frequency as the magnification ratio of the up-converter increases. The video signal passed through the second band pass filter 57 is input to the limiter 15.

The second stage and the third stage of FIG. 28 show a contrast between the video signal input to the second band pass filter 57 and the output therefrom at the time of the input. In the second stage, the peaks i1, i2, i3, i4, and i5 in periods k1 and k2 are film grain. Since the video signal passes through the band pass filter 57, the film grain and the transition point k3 between period k1 and period k2 appear in the output signal of the band pass filter 57.

Detail 2: Limiter 15

The limiter 15 operates in the same manner as the limiter pertaining to embodiment 1 of the present invention.

This completes the description of the film grain detection circuit 51 pertaining to embodiment 3. The following explains the third frequency converter 52 with reference to FIGS. 27, 29 and 30.

Details of the Third Frequency Converter 52

Figure 27:
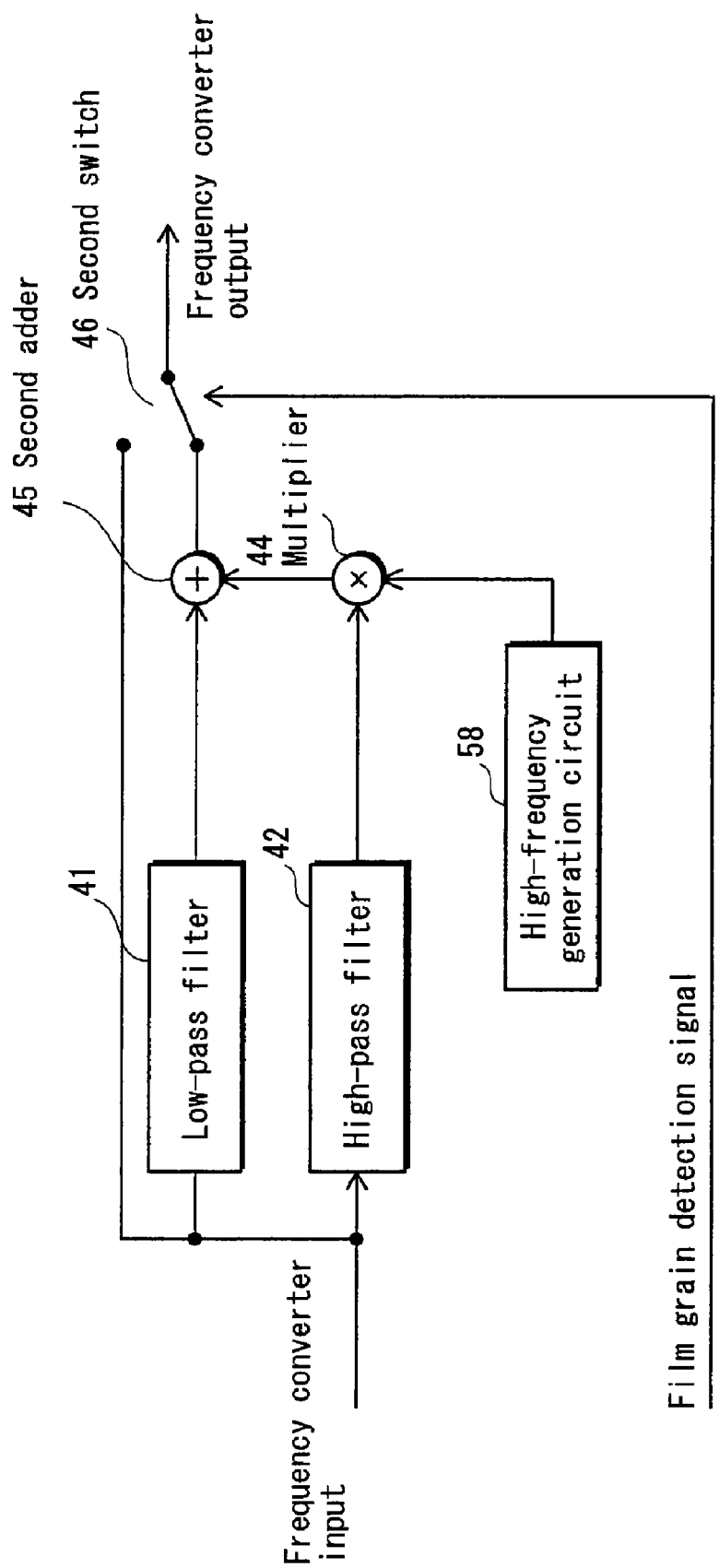
FIG. 27 shows an internal structure of a third frequency converter 52 pertaining to embodiment 3.

FIG. 27 is an internal structure of a third frequency converter 52.

The third frequency converter 52 is based on the second frequency converter 35 pertaining to embodiment 2. In comparison with the second frequency converter 35 pertaining to embodiment 2, the low-pass filter 41, the high-pass filter 42, the multiplier 44, the second adder 45 and the second switch 46 of the third frequency converter 52 pertaining to embodiment 3 are the same as those of the second frequency converter 35, and the amplitude normalization circuit 43 of the second frequency converter 35 is replaced with a high-frequency generation circuit 58. Also, the third frequency converter 52 has "a frequency converter input" terminal, a film grain detection signal input" terminal, and a "frequency converter output" terminal as the frequency converter 7 has. The "frequency converter input" is a terminal into which a video signal output from the up-converter 5 is input. The "film grain detection signal input" is a terminal into which a signal output from the third film grain detection circuit 51 is input. The frequency converter 52 plays a roll of converting the spatial frequency of the film grain signal component included in the original video signal.

FIG. 29 is a timing chart showing an operation of the third frequency converter 52 pertaining to embodiment 3. FIG. 30 is a timing chart showing a contrast between a signal output from the third film grain detection circuit 51 pertaining to embodiment 3 and a signal output from the third frequency converter 52 pertaining to embodiment 3. Hereinafter, the frequency converter 7 is described with reference to this timing chart together with FIG. 27.

Detail 1: Low-Pass Filter 41

The low-pass filter 41 has the function to pass only low-frequency components of input video signals. In FIG. 29, the low-pass filter 41 outputs the signal shown in the third stage in response to the input signal shown in the second stage.

Detail 2: High-Pass Filter 42

The high-pass filter 42 has the function to pass only high-frequency components of input video signals. In FIG. 29, the high-pass filter 42 outputs the signal shown in the fourth stage in response to the input signal shown in the second stage.

Detail 3: High-Frequency Generation Circuit 58

The high-frequency generation circuit 58 generates a high-frequency signal having the peak value of "1" and the bottom value of "0". The high-frequency generation circuit 58 outputs the signal shown in the fifth stage of FIG. 29.

Detail 4: Multiplier 44

The multiplier 44 is a circuit that multiplies the output from the high-pass filter 42 by the output signal from the high-frequency generation circuit 58 and thereby functions as a variable-gain amplifier. As explained above, the high-frequency generation circuit 58 generates a high-frequency signal having the peak value of "1" and the bottom value of "0". Thus the multiplier 44 is given a signal having a high-frequency domain resulting from modulation of the output of the high-pass filter 42.

Thus, the multiplier 44 multiplies the input from the high-pass filter 42 shown in the fourth stage of FIG. 29 by the signal from the high-frequency generation circuit 58 shown in the fifth stage of the same, and outputs the signal shown in the first stage of FIG. 30.

Detail 5: Second Adder 45

The second adder 45 sums up the output from the low-pass filter 41 and the output from the multiplier 44. As a result, the second adder 45 outputs the signal shown in the third stage of FIG. 30. In comparison with the output from the second up-converter 5 shown in the second stage of FIG. 29, the waveform shows that only the frequency of the high-frequency components with a small amplitude are converted to be higher.

Detail 6: Second Switch 46

While the third film grain detection circuit 51 is detecting no film grain, the second switch 46 outputs the frequency converter input as the frequency converter output without change. While the third film grain detection circuit 51 is detecting film grain, the second switch outputs the output from the second adder 45 as the frequency converter output. The frequency converter output is shown in the fifth stage of FIG. 30.

This completes the description of the third frequency converter 52.

The following explains the video signal transmitted from the playback apparatus explained above to the monitor, with reference to FIG. 29 and FIG. 30 again.

As explained above, the first stage of FIG. 29 shows the video signal before the up-conversion, and the second stage shows the video signal after the up-conversion. A comparison between the first stage and the second stage shows that there is no change in the waveform. The fourth stage of FIG. 30 shows the period in which the third film grain detection circuit 51 is detecting film grain. As the fifth stage of FIG. 30 shows, the frequency of small-amplitude signal, output from the third frequency converter 52 in the period where film grain is detected is converted to be a high frequency.

SUMMARY

The following describes changes in the content of an SD image containing film grains when up-conversion is performed, and when the spatial frequency of the film grains has been converted to a higher frequency after up-conversion of the SD image.

FIG. 31A shows how an SD image containing noise changes when up-conversion is performed. The left side of FIG. 31A shows the SD image before the up-conversion, and the right side shows the HD image after the up-conversion. Film grains that are expressed on the left side by one pixel are expressed on the right side by a plurality of pixels, 2 vertical pixels by 2 horizontal pixels.

FIG. 31B shows the SD image of FIG. 31A before the up-conversion and an exemplary HD image after up-conversion when displayed on a television of the same size. The left side of the present drawing shows the SD image, and the right side shows the HD image. Since the film grains that are expressed on the left side by one pixel are expressed on the right side by a plurality of pixels, 2 vertical pixels by 2 horizontal pixels, the size of the film grain in proportion to the image as a whole does not change, and the user does not have a tangible sense that the image became high-definition as a result of the up-conversion.

Figures 32A, 32B:
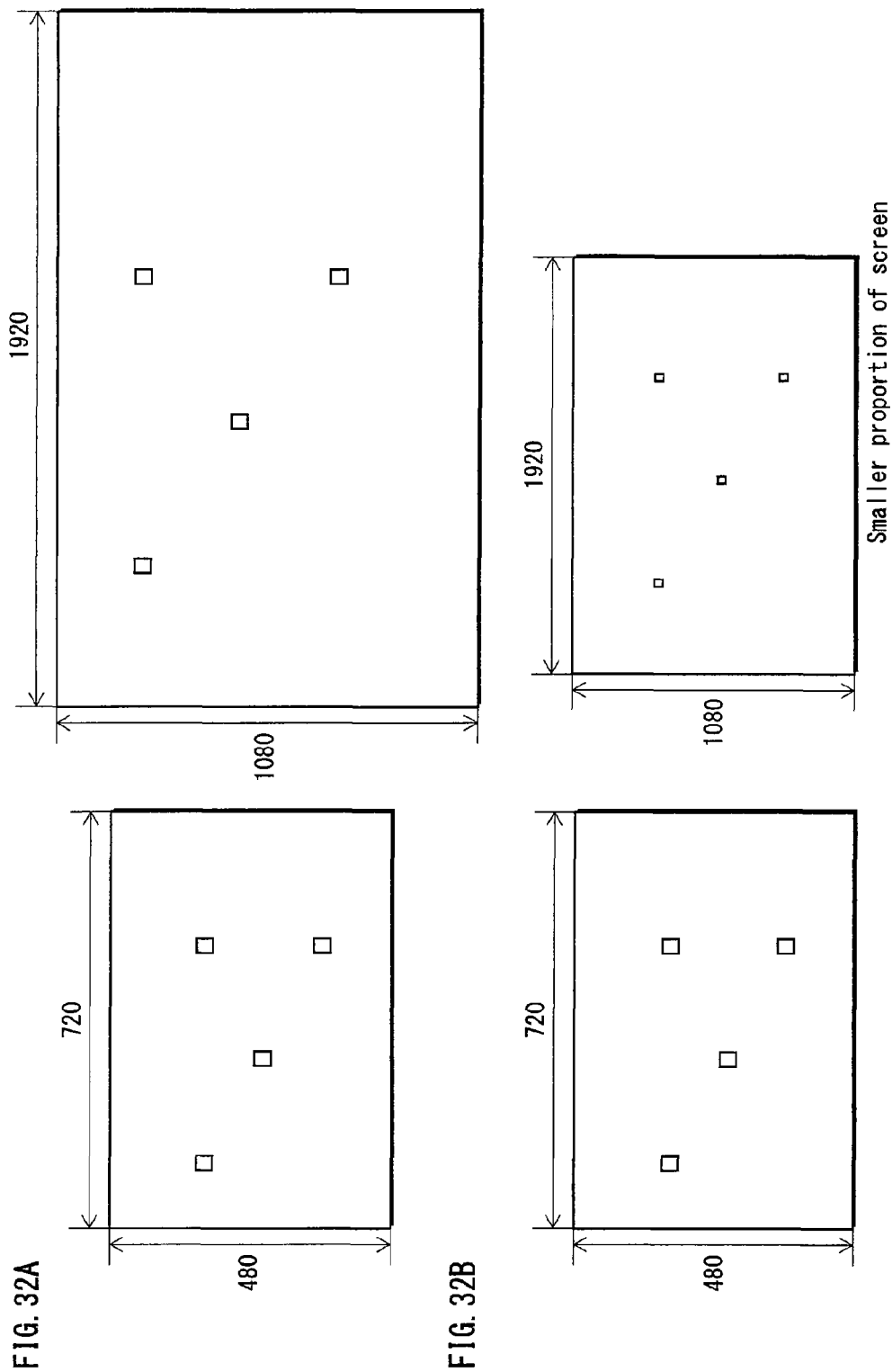
FIG. 32A contrasts how an SD image changes when the frequency of film grains has been converted after up-conversion of the SD image.
FIG. 32B shows the SD image of FIG. 32A before the up-conversion and an exemplary display of an HD image on a television of the same size when the frequency of film grains has been converted after the up-conversion.

FIG. 32A contrasts how an SD image changes when the frequency of film grains has been converted after up-conversion of the SD image. The left side of the present drawing shows the SD image before up-conversion, and the right side shows the HD image after up-conversion. Since the signal in which the frequency of the film grains has been converted is shown instead of the film grains that are expressed on the left side by one pixel, the HD image on the right side shows smaller film grains.

FIG. 32B shows the SD image before the up-conversion of FIG. 32A and an exemplary display of an HD image after up-conversion when displayed on a television of the same size. The left side of the present drawing is the SD image, and the right side is the HD image. Since the film grains that are represented on the left side as one pixel is represented instead on the right side as smaller film grains, a size ratio of the film grain to the image as a whole is smaller, thus giving the user a tangible sense that the image became high-definition as a result of the up-conversion.

Furthermore, the playback apparatus pertaining to the present embodiment has a function to allow the user to select whether to use the film grain frequency conversion. This function is provided because artificial videos such as animations do not contain film grains originally in some cases, and in such cases, the third film grain detection circuit 51 might erroneously detect small-amplitude components of the video signal as film grains, and degrade the video signal.

For this purpose, the playback apparatus pertaining to the present embodiment includes a GUI generator 53, a controller 54, a remote control 55 and a third switch 56.

Figure 33:
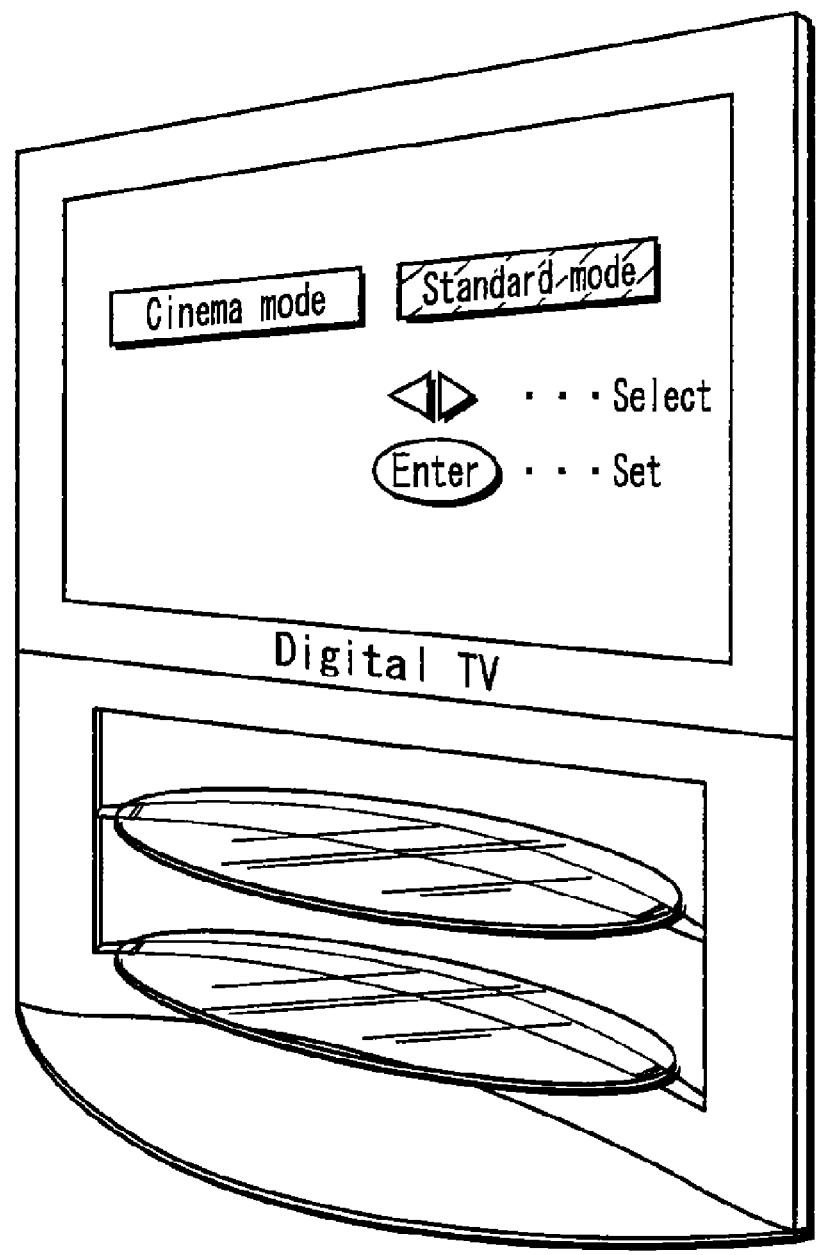
FIG. 33 shows an example of a setup menu.

To select whether to use the film grain frequency conversion function, the user of the playback apparatus pertaining to the present embodiment puts the playback apparatus into a function setting mode by using a button (not illustrated) on the remote control 55. The GUI generator 53 generates a setup menu image as shown in FIG. 33. The user can select whether to use the film grain frequency conversion function. Specifically, the user uses left and right cursor buttons (not illustrated) to highlight either the standard mode or the cinema mode shown on the setup screen in FIG. 33, and the controller 54 memorizes the setting. Next, the user notifies the playback apparatus of the start of the playback by using a playback start button (not illustrated) on the remote control 55. According to the setting memorized in the function setting mode, indicating whether or not to use the frequency conversion function, the controller 54 sets the third switch 56 such that the third frequency converter 52 will be the input in the case of using the frequency conversion function and sets the third switch 56 such that the up-converter 5 will be the input in the case of not using the frequency conversion function. This structure enables control for selecting whether or not to use the film grain frequency conversion function according to the user's intention.

As explained above, according to the present embodiment, film grains are detected from output of the up-converter for converting the video signal so as to have a high resolution, and the frequency components of the film grains to be a high frequency. Thus, the tangible sense of high definition of the video signal after the up-conversion is increased, which is an advantage of the present embodiment. Moreover, it allows the user to select whether or not to use such a function.

According to the present embodiment, a predetermined frequency domain is extracted from the video signal, changes in the video signal in the extracted frequency domain are judged and the result of the judgment is used as the film grain detection signal. However, in the same manner as in embodiment 2, correlation between frames may be compared, changes in the video signal may be judged based on the differential signal, and the result of the judgment may be used as the film grain detection signal.

Supplementary Remarks

This completes the description of the best modes of carrying out the invention known to the applicant at the time of application. However, further improvements and variations related to the technical topics indicated below can be added. Whether to carry out the invention as indicated in the embodiments or to use these improvements and variations is arbitrary, and is left to the discretion of the one who carries out the invention.

Image Resolution

In embodiments 1 and 3, an original video signal of 480 vertical lines and 720 horizontal pixels is converted into a high-definition image signal of 1080 vertical lines and 1920 horizontal pixels. Also, in embodiment 2 of the present invention, the original video signal of 480 vertical lines and 720 horizontal pixels is converted into a high-definition image signal of 720 vertical lines and 1280 horizontal pixels. However, the effects of the present invention can also be realized with an original video signal having another pixel structure, provided that the resolution converter converts a video signal into a higher-resolution video signal. Specifically, similar effects can be realized in cases such as when an original video signal of 576 lines and 720 horizontal pixels is converted into 720 lines and 1280 horizontal pixels, an original video signal of 576 lines and 720 horizontal pixels is converted into 1080 lines and 1920 horizontal pixels, an original video signal of 720 lines and 1280 horizontal pixels is converted into 1080 lines and 1920 horizontal pixels, or an original video signal of 1080 lines and 1920 horizontal pixels is converted into a higher resolution such as 2160 lines and 4090 horizontal pixels.

According to the embodiments above, the vertical lines and the horizontal pixels are converted to be high-definition. However, similar effects can be realized in cases of resolution conversion where the number of either the vertical pixels or the horizontal pixels is increased.

Relation to Stream Information

The playback apparatus pertaining to embodiment 3 has a structure allowing the user to select whether to use the film grain frequency conversion function. However, whether to use the function may be determined based on extra information permitted to be provided in an MPEG stream.

For example, in the case the attribute of an MPEG stream is Progressive, the stream is considered as a stream derived from a film, and the spatial frequency conversion function is enabled. In the case the attribute of an MPEG stream is Interlace, the spatial frequency conversion function is disabled.

Target of Film Grain Measurement

Although in embodiments 1 to 3, film grains in a total amplitude band of a luminance signal are measured, effects of the present invention can be achieved by measuring film grains in a specified luminance band, even if the film grains in the total amplitude band of the luminance signal are not measured, or by using a chrominance signal instead of a luminance signal as the signal whose film grains are measured.

Expansion to a Recording Device

If the constituent elements shown in embodiments 1 to 3 are provided in a recording device, when the recording device records a video signal to a disc, the film grain spatial frequency conversion may be performed along with the up-conversion described above, and a video signal which has been converted may be recorded to the disc. This is especially advantageous when inputting an SD image and recording to a disc such as a BD-RE or HD-DVD, which are intended for the recording of an HD image. Also, when recording a disc in this way, performing the film grain spatial frequency conversion in advance enables creating a high-definition feel even when the video signal is played back in a playback apparatus that is not intended for the film grain spatial frequency conversion.

Also, constituent elements for performing the film grain spatial frequency conversion such as is described above may be provided in an up-converter used at an authoring location. The video signal after the film grain spatial frequency conversion may be recorded on a master disc, and read-only discs may be mass-produced from it.

System LSI

The essential parts of the present invention are the up-converter 5 and the circuits peripheral thereto (the film grain detection circuit 6 and the frequency conversion circuit 7). These essential parts of the playback apparatus may be configured separately as a system LSI.

A system LSI refers to a package in which a bare chip has been mounted on a high-density substrate. A system LSI also refers to a package in which two or more bare chips have been given the outward construction of a single LSI by mounting the bare chips on a high-density substrate. (This kind of system LSI is called a multi-chip module).

Focusing now on the types of packages, system LSIs include QFP (quad flat packages) and PGA (pin grid arrays). A QFP is a system LSI in which pins are attached to the four-sides of the package. A PGA is a system LSI in which a majority of the pins are attached to the bottom of the package.

These pins act as interfaces to other circuits. Given that the pins in a system LSI have this role as interfaces, the system LSI acts as the core of the playback apparatus by connecting the pins to other circuits.

The system LSI can be incorporated not only in a playback apparatus, various devices capable of video playback, such as a television, game console, personal computer, or "One-Seg" mobile phone.

The following are details of specific production procedures. First, a circuit diagram of portions to be included in the system LSI is created based on the structure diagram shown in the embodiments, and the constituent elements in the structure diagrams are realized using circuit elements, ICs and LSIs.

Buses connecting the circuit elements, ICs and LSIs, as well as interfaces with peripheral circuits and external devices are defined as the constituent elements are realized. Furthermore, connection lines, power lines, ground lines, clock signal lines and the like are defined. In these definitions, the operation timings of each constituent element are adjusted taking in account the specifications of the LSI, and other adjustments, such as ensuring the bandwidth necessary for each constituent element, are made as well. The circuit diagram is thus completed.

After the circuit diagram is completed, implementation designing is performed. Implementation designing refers to the creation of a substrate layout that determines where on the substrate to place the parts (circuit elements, ICs, LSIs) in a circuit diagram created by circuit designing, and how to wire connection lines in the circuit diagram on the substrate.

Here, the implementation designing includes automatic placing and automatic wiring.

When a CAD apparatus is used, automatic placing can be achieved with use of a dedicated algorithm called "centroid method". In the automatic wiring, connection lines that connect the pins of parts in the circuit diagram are defined using metal foils and vias. When using a CAD apparatus, this wiring process can be achieved using dedicated algorithms called "maze method" and "line-search method".

After the implementation designing is performed and the layout on the substrate is determined, the implementation designing results are converted into CAM data, and the CAM data is output to an NC machine tool etc. An NC machine tool performs SoC (System on Chip) implementation or SiP (System in Package) implementation based on the CAM data. SoC implementation a technique for fusing a plurality of circuits to a single chip. SiP implementation is a technique for using resin or the like to form a plurality of chips into a single package. The processes described above enable production of the system LSI pertaining to the present invention, based on the internal structures of the playback apparatus described in the embodiments above.

Note that an integrated circuit generated as described above may also be referred to as an IC, an LSI, a super LSI, or an ultra LSI, depending on the degree of integration.

Furthermore, all or some of the constituent elements of the control apparatuses may be constituted as a single chip. The integration is also not limited to SoC and SiP implementation, but instead may be realized by a dedicated circuit or a general-purpose process. After LSI manufacture, the use of a field programmable gate array (FPGA) or a silicon flexible processor in which the connection and settings of circuit cells in the LSI can be restructured is possible. Furthermore, if integration technology is developed that replaces LSIs due to progressive or derivative semiconductor technology, integration of functional blocks using this technology is naturally possible. For example, the application of biotechnology is a possibility.

Architecture

Since the system. LSI of the present invention is assumed to be integrated in a playback apparatus, it is desirable to make the system LSI compliant with UniPhier architecture.

A system LSI that is compliant with UniPhier architecture is constituted from the following circuit blocks.

Data Parallel Processor (DPP)

This is a SIMD-type processor in which a plurality of element processors operate identically and, by causing the computing units in the element processors to operate at the same time with a single instruction, achieves parallel decoding processing on a plurality of pixels that compose a picture.

Instruction Parallel Processor (IPP)

The instruction parallel processor is constituted from an instruction RAM, an instruction cache, a data RAM, a "Local Memory Controller" composed of a data cache, an instruction fetch unit, a decoder, an execution unit, a "Processing Unit"

composed of a register file, and a "Virtual Multi Processor Unit" that causes the Processing Unit to perform parallel execution of a plurality of applications.

CPU Block

The CPU block is constituted from an ARM core, an external bus interface (Bus Control Unit: BCU), a DMA controller, a timer, and a vector interruption controller that are peripheral circuits, and peripheral interfaces such as an UART, a GPIO (General Purpose Input Output), and a synchronization serial interface. The controller described above is implemented in a system LSI as the CPU block.

Stream I/O Block

The stream I/O block performs data input/output between a drive device, an optical hard disk drive device, and an SD memory card drive device connected on an external bus, via a USB interface or an ATA packet interface.

AV I/O Block

The AV I/O block is composed of an audio input/output, a video input/output, and an OSD controller, and performs data input and output with a television and an AV amp.

Memory Control Block

This is a block that realizes reading/writing from/to an SD-RAM connected via an external bus, and is composed of an internal bus connection unit that controls internal connections between the blocks, an access control unit that performs data transfers to/from the SD-RAM externally connected to the system LSI, and an access schedule unit that adjusts SD-ROM access requests from the blocks.

When manufacturing a system LSI compliant with this architecture, it is preferable to employ a bottom-up style of layout technique, which involves performing layout design for each circuit block such as the IPP and DPP, optimizing performance of the circuit blocks, and assembling the blocks, in order to complete a 1-chip layout for each block.

Note that the second frequency converter 35 described in embodiment 2 is applicable to embodiment 1 and embodiment 3 as well. That is to say, the frequency converter 7 of embodiment 1 may be replaced with the second frequency converter 35, and the third frequency converter 52 of embodiment 3 may be replaced with the second frequency converter 35.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

INDUSTRIAL APPLICABILITY

The above embodiments disclose internal structures of a playback apparatus of the present invention. Since the playback apparatus can obviously be mass-produced according to the internal structure, the device is industrially applicable. Therefore, a playback apparatus of the present invention can be applied to development of products in the field of DVD±R players, DVD±R recorders, hard disk recorders, video recorders using a broadcast receiver or a semiconductor memory, etc.

What is claimed is:

1. A playback apparatus comprising:
   a resolution converter to increase the number of either or both horizontal pixels and vertical pixels in a frame image of an input video signal to produce an enhanced video signal;
   a spatial frequency converter to increase the spatial frequency of small-amplitude components detected in a particular spatial frequency domain of the video signal either before or after a process performed by the resolution converter, without increasing the number of the small-amplitude components in the particular spatial frequency domain forming a film grain in the frame image; and
   a film grain detection circuit connected to the spatial frequency converter and receiving the video signal to detect locations of film grains in the video signal from a film developed with a silver salt as a small-amplitude component in a particular spatial frequency domain of the video signal to enable the spatial frequency converter to not change a peak value of the small-amplitude component, at the locations of the detected film grains, when increasing the spatial frequency thereof whereas the resolution converter will not enlarge the film grains when the resolution conversion is increased.

2. The playback apparatus of claim 1, wherein the particular spatial frequency domain has a peak in a frequency range that is different from a direct-current frequency range.

3. The playback apparatus of claim 2, wherein the spatial frequency converter does not change a peak value of an amplitude of the small-amplitude component when increasing the spatial frequency thereof.

4. The playback apparatus of claim 3, wherein the spatial frequency converter detects the small amplitude components from the enhanced video signal after the resolution conversion, and performs the spatial frequency conversion on a noise domain of the enhanced video signal as the particular spatial frequency domain, the noise domain containing noise and being defined according to a magnification ratio of the resolution conversion performed by the resolution converter.

5. The playback apparatus of claim 4, further comprising:
   a receiver operable to receive a selection of a first mode or a second mode from a user, the first mode for performing the spatial frequency conversion and the second mode for not performing the spatial frequency conversion, wherein
   the spatial frequency converter performs the spatial frequency conversion if the receiver receives a selection of the first mode.

6. The playback apparatus of claim 1, wherein the film grain detection circuit includes a band pass filter for transmitting only a midrange of input signals and a limiter for extracting a small-amplitude component representative of a grain location.

7. The playback apparatus of claim 6, wherein the spatial frequency converter includes a switch control circuit and a switch connected to the switch control circuit to thin out the video signals according to a film grain detection signal from the film grain detection circuit input into the switch control circuit.

8. A playback apparatus comprising:
   a resolution converter to increase the number of either or both horizontal pixels and vertical pixels in a frame image of an input video signal to produce an enhanced video signal;
   a spatial frequency converter to increase the spatial frequency of small-amplitude components detected in a particular spatial frequency domain of an inter-frame differential signal of the video signal before or after a process performed by the resolution converter, without increasing the number of the small-amplitude components in the particular spatial frequency domain forming a film grain in the frame image; and a film grain detection circuit connected to the spatial frequency converter and receiving the video signal to detect locations of film grains in the video signal from a film developed with a silver salt as a small-amplitude component in a particular spatial frequency domain of the video signal to enable the spatial frequency converter to not change a peak value of the small-amplitude component, at the locations of the detected film grains, when increasing the spatial frequency thereof whereas the resolution converter will not enlarge the film grains when the resolution conversion is increased.

9. The playback apparatus of claim 8, wherein the particular spatial frequency domain has a peak in a frequency range that is different from a direct-current frequency range.

10. The playback apparatus of claim 9, wherein the spatial frequency converter does not change a peak value of an amplitude of the small-amplitude component when increasing the spatial frequency thereof.

11. The playback apparatus of claim 10, wherein the spatial frequency converter detects the small-amplitude components from the inter-frame differential signal of the enhanced video signal after the resolution conversion, and performs the spatial frequency conversion on a noise domain of the enhanced video signal as the particular spatial frequency domain, the noise domain containing noise and being defined according to a magnification ratio of the resolution conversion performed by the resolution converter.

12. The playback apparatus of claim 11, further comprising a receiver operable to receive a selection of a first mode or a second mode from a user, the first mode for performing the spatial frequency conversion and the second mode for not performing the spatial frequency conversion, wherein the spatial frequency converter performs the spatial frequency conversion if the receiver receives a selection of the first mode.

13. The playback apparatus of claim 8, wherein the film grain detection circuit includes a band pass filter for transmitting only a midrange of input signals and a limiter for extracting a small-amplitude component representative of a grain location.

14. The playback apparatus of claim 13, wherein the spatial frequency converter includes a switch control circuit and a switch connected to the switch control circuit to thin out the video signals according to a film grain detection signal from the film grain detection circuit input into the switch control circuit.

* * * * *